United States Patent
Allen et al.

(10) Patent No.: US 8,266,274 B2
(45) Date of Patent: Sep. 11, 2012

(54) METHOD AND APPARATUS FOR DATA PROCESSING

(75) Inventors: Stewart O. Allen, Reston, VA (US);
Scott F. Cosby, Alexandria, VA (US);
Dylan J. Greene, Falls Church, VA (US); Matthew J. Keesan, Washington, DC (US); Hooman Radfar, Arlington, VA (US); Carlos F. Reverte, Miami, FL (US); Richard Scott Labarca, Bellport, NY (US)

(73) Assignee: Clearspring Technologies, Inc., McLean, VA (US)

( * ) Notice: Subject to any disclaimer, the term of this patent is extended or adjusted under 35 U.S.C. 154(b) by 858 days.

(21) Appl. No.: 12/043,805

(22) Filed: Mar. 6, 2008

(65) Prior Publication Data
US 2008/0222613 A1 Sep. 11, 2008

Related U.S. Application Data

(60) Provisional application No. 60/893,330, filed on Mar. 6, 2007, provisional application No. 60/977,544, filed on Oct. 4, 2007.

(51) Int. Cl.
*G06F 15/173* (2006.01)
(52) U.S. Cl. .......................... 709/224; 709/216; 709/217
(58) Field of Classification Search .................. 709/216, 709/217, 224
See application file for complete search history.

(56) References Cited

U.S. PATENT DOCUMENTS

| | | | |
|---|---|---|---|
| 5,230,072 A | 7/1993 | Smith et al. | |
| 5,261,002 A | 11/1993 | Perlman et al. | |
| 5,675,510 A | 10/1997 | Coffey et al. | |
| 5,781,189 A | 7/1998 | Holleran et al. | |
| 5,796,952 A | 8/1998 | Davis et al. | |
| 5,857,102 A | 1/1999 | McChesney et al. | |
| 5,892,900 A | 4/1999 | Ginter et al. | |
| 5,896,532 A | 4/1999 | Blewett | |
| 5,951,643 A | 9/1999 | Shelton et al. | |
| 6,064,980 A | 5/2000 | Jacobi et al. | |

(Continued)

FOREIGN PATENT DOCUMENTS

EP 0 996 058 A1 10/1998

(Continued)

OTHER PUBLICATIONS

International Search Report and Written Opinion for International Application No. PCT/US08/56073, mailed Aug. 8, 2008, 8 pages.

(Continued)

*Primary Examiner* — Adnan Mirza
(74) *Attorney, Agent, or Firm* — Cooley LLP

(57) ABSTRACT

A method and system can include multiple data handling stages for manipulating tracked information associated with content distributed to users and/or computers, such as static objects, media objects, and/or software objects, for example. The content can be distributed as widget instances and the associated tracked information can be received over a network. The information received can be associated with a session corresponding to each widget instance and/or with multiple identifiers, such as widget, user, content, session, content aggregation point, processor, and/or placement identifiers, for example. Data handling processes, including sorting, storing, filtering, combining, queuing, and/or authenticating, for example, can be performed during the data handling stages. The processed information can be used to determine modifications to a behavior associated with widgets and/or widget containers.

27 Claims, 17 Drawing Sheets

U.S. PATENT DOCUMENTS

| | | | |
|---|---|---|---|
| 6,100,890 | A | 8/2000 | Bates et al. |
| 6,108,637 | A | 8/2000 | Blumenau |
| 6,112,238 | A | 8/2000 | Boyd et al. |
| 6,125,388 | A | 9/2000 | Reisman |
| 6,233,601 | B1 | 5/2001 | Walsh |
| 6,233,684 | B1 | 5/2001 | Stefik et al. |
| 6,236,971 | B1 | 5/2001 | Stefik et al. |
| 6,266,649 | B1 | 7/2001 | Linden et al. |
| 6,269,361 | B1 | 7/2001 | Davis et al. |
| 6,311,194 | B1 | 10/2001 | Sheth et al. |
| 6,314,448 | B1 | 11/2001 | Conner et al. |
| 6,317,787 | B1 | 11/2001 | Boyd et al. |
| 6,360,261 | B1 | 3/2002 | Boyd et al. |
| 6,374,252 | B1 | 4/2002 | Altoff et al. |
| 6,466,974 | B1 | 10/2002 | Nelson et al. |
| 6,546,393 | B1 | 4/2003 | Khan |
| 6,658,568 | B1 | 12/2003 | Ginter et al. |
| 6,665,867 | B1 | 12/2003 | Ims et al. |
| 6,701,521 | B1 | 3/2004 | McLlroy et al. |
| 6,748,555 | B1 | 6/2004 | Teegan et al. |
| 6,772,180 | B1 | 8/2004 | Li et al. |
| 6,810,356 | B1 | 10/2004 | Garcia-Franco et al. |
| 6,857,124 | B1 | 2/2005 | Doyle |
| 6,970,853 | B2 | 11/2005 | Schutzer |
| 6,985,905 | B2 | 1/2006 | Prompt et al. |
| 6,985,929 | B1 | 1/2006 | Wilson et al. |
| 6,986,049 | B2 | 1/2006 | Delany |
| 7,003,522 | B1 | 2/2006 | Reynar et al. |
| 7,003,565 | B2 | 2/2006 | Hind et al. |
| 7,016,960 | B2 | 3/2006 | Howard et al. |
| 7,024,392 | B2 | 4/2006 | Stefik et al. |
| 7,031,932 | B1 | 4/2006 | Lipsky et al. |
| 7,035,943 | B2 | 4/2006 | Yamane et al. |
| 7,039,599 | B2 | 5/2006 | Merriman et al. |
| 7,046,995 | B2 | 5/2006 | Rygaard |
| 7,054,900 | B1 | 5/2006 | Goldston |
| 7,062,500 | B1 | 6/2006 | Hall et al. |
| 7,062,540 | B2 | 6/2006 | Reddy et al. |
| 7,062,561 | B1 | 6/2006 | Reisman |
| 7,072,672 | B1 | 7/2006 | Vanska et al. |
| 7,076,521 | B2 | 7/2006 | Davison |
| 7,080,159 | B2 | 7/2006 | Chu et al. |
| 7,085,682 | B1 | 8/2006 | Heller et al. |
| 7,089,237 | B2 | 8/2006 | Turnbull et al. |
| 7,099,926 | B1 | 8/2006 | Ims et al. |
| 7,100,054 | B2 | 8/2006 | Wenisch et al. |
| 7,103,912 | B2 | 9/2006 | Xia et al. |
| 7,117,250 | B1 | 10/2006 | Wu |
| 7,117,535 | B1 | 10/2006 | Wecker |
| 7,130,964 | B2 | 10/2006 | Ims et al. |
| 7,133,846 | B1 | 11/2006 | Ginter et al. |
| 7,159,116 | B2 | 1/2007 | Moskowitz |
| 7,263,551 | B2 | 8/2007 | Belfiore et al. |
| 7,346,909 | B1 | 3/2008 | Eldar et al. |
| 7,392,395 | B2 | 6/2008 | Ginter et al. |
| 7,392,483 | B2 | 6/2008 | Wong et al. |
| 7,702,675 | B1 | 4/2010 | Khosla et al. |
| 7,730,082 | B2 | 6/2010 | Sah et al. |
| 7,735,117 | B2 * | 6/2010 | Nadalin et al. .................... 726/2 |
| 2002/0040314 | A1 | 4/2002 | Tolson |
| 2002/0040394 | A1 | 4/2002 | Shapira |
| 2002/0072965 | A1 | 6/2002 | Merriman et al. |
| 2002/0082914 | A1 | 6/2002 | Beyda et al. |
| 2002/0082923 | A1 | 6/2002 | Merriman et al. |
| 2002/0082997 | A1 | 6/2002 | Kobata et al. |
| 2002/0083188 | A1 | 6/2002 | Hericy et al. |
| 2002/0095336 | A1 | 7/2002 | Trifon et al. |
| 2002/0099600 | A1 | 7/2002 | Merriman et al. |
| 2002/0120673 | A1 | 8/2002 | Tolson et al. |
| 2002/0129092 | A1 | 9/2002 | Tolson et al. |
| 2002/0174200 | A1 | 11/2002 | Kozina |
| 2003/0014483 | A1 | 1/2003 | Stevenson et al. |
| 2003/0028433 | A1 | 2/2003 | Merriman et al. |
| 2003/0033403 | A1 | 2/2003 | Rhodes |
| 2003/0058277 | A1 | 3/2003 | Bowman-Amuah |
| 2003/0070061 | A1 | 4/2003 | Wong et al. |
| 2003/0105882 | A1 | 6/2003 | Ali et al. |
| 2003/0196121 | A1 | 10/2003 | Raley et al. |
| 2003/0200145 | A1 | 10/2003 | Krassner et al. |
| 2004/0073755 | A1 | 4/2004 | Webb et al. |
| 2004/0098349 | A1 | 5/2004 | Tolson |
| 2004/0107125 | A1 | 6/2004 | Guheen et al. |
| 2004/0143667 | A1 | 7/2004 | Jerome |
| 2004/0153973 | A1 | 8/2004 | Horwitz |
| 2004/0165007 | A1 | 8/2004 | Shafron |
| 2004/0172324 | A1 | 9/2004 | Merriman et al. |
| 2004/0172331 | A1 | 9/2004 | Merriman et al. |
| 2004/0172332 | A1 | 9/2004 | Merriman et al. |
| 2004/0215509 | A1 | 10/2004 | Perry |
| 2004/0215515 | A1 | 10/2004 | Perry |
| 2004/0215709 | A1 | 10/2004 | Basani et al. |
| 2004/0225562 | A1 | 11/2004 | Turner |
| 2004/0225566 | A1 | 11/2004 | Beyda et al. |
| 2004/0225668 | A1 | 11/2004 | Teegan et al. |
| 2005/0021611 | A1 | 1/2005 | Knapp et al. |
| 2005/0038702 | A1 | 2/2005 | Merriman et al. |
| 2005/0050301 | A1 | 3/2005 | Whittle et al. |
| 2005/0055458 | A1 | 3/2005 | Mohan et al. |
| 2005/0086587 | A1 | 4/2005 | Balz |
| 2005/0114774 | A1 | 5/2005 | Berryman |
| 2005/0125528 | A1 | 6/2005 | Burke, II et al. |
| 2005/0190994 | A1 | 9/2005 | Yamanaka |
| 2005/0197991 | A1 | 9/2005 | Wray et al. |
| 2005/0198105 | A1 | 9/2005 | Schmitz et al. |
| 2005/0198201 | A1 | 9/2005 | Bohn et al. |
| 2005/0210000 | A1 | 9/2005 | Michard |
| 2005/0246262 | A1 | 11/2005 | Aggarwal et al. |
| 2005/0251805 | A1 | 11/2005 | Bamba et al. |
| 2005/0256819 | A1 | 11/2005 | Tibbs et al. |
| 2005/0256954 | A1 | 11/2005 | Shapira et al. |
| 2006/0004703 | A1 | 1/2006 | Spivack et al. |
| 2006/0015406 | A1 | 1/2006 | Beyda et al. |
| 2006/0088044 | A1 | 4/2006 | Hammerl |
| 2006/0089880 | A1 | 4/2006 | Merriman et al. |
| 2006/0106876 | A1 | 5/2006 | MacGregor |
| 2006/0112102 | A1 | 5/2006 | Shafron |
| 2006/0112341 | A1 | 5/2006 | Shafron |
| 2006/0129937 | A1 | 6/2006 | Shafron |
| 2006/0136843 | A1 | 6/2006 | Shafron |
| 2006/0161513 | A1 | 7/2006 | Drumm et al. |
| 2006/0178918 | A1 | 8/2006 | Mikurak |
| 2006/0190290 | A1 | 8/2006 | Gomez |
| 2006/0212589 | A1 | 9/2006 | Hayer et al. |
| 2006/0218036 | A1 | 9/2006 | King et al. |
| 2006/0242379 | A1 | 10/2006 | Korgaonkar et al. |
| 2006/0259462 | A1 | 11/2006 | Timmons |
| 2006/0277457 | A1 | 12/2006 | Salkind et al. |
| 2007/0038934 | A1 | 2/2007 | Fellman |
| 2007/0078777 | A1 | 4/2007 | Demartini et al. |
| 2007/0078953 | A1 | 4/2007 | Chai et al. |
| 2007/0101146 | A1 | 5/2007 | Louch et al. |
| 2007/0101291 | A1 | 5/2007 | Forstall et al. |
| 2007/0101297 | A1 | 5/2007 | Forstall et al. |
| 2007/0106759 | A1 | 5/2007 | Willie et al. |
| 2007/0112676 | A1 | 5/2007 | Konito et al. |
| 2007/0130541 | A1 | 6/2007 | Louch et al. |
| 2007/0192329 | A1 | 8/2007 | Croft et al. |
| 2007/0192339 | A1 * | 8/2007 | Baker et al. .................... 707/100 |
| 2007/0209013 | A1 | 9/2007 | Ramsey et al. |
| 2007/0250618 | A1 | 10/2007 | Hammond |
| 2007/0266093 | A1 | 11/2007 | Forstall et al. |
| 2007/0288518 | A1 | 12/2007 | Crigler et al. |
| 2007/0288858 | A1 | 12/2007 | Pereira et al. |
| 2008/0010133 | A1 | 1/2008 | Pyhalammi et al. |
| 2008/0010319 | A1 | 1/2008 | Vonarburg et al. |
| 2008/0028294 | A1 | 1/2008 | Sell et al. |
| 2008/0034040 | A1 | 2/2008 | Wherry et al. |
| 2008/0034314 | A1 | 2/2008 | Louch et al. |
| 2008/0040426 | A1 | 2/2008 | Synstelien et al. |
| 2008/0040681 | A1 | 2/2008 | Synstelien et al. |
| 2008/0071883 | A1 | 3/2008 | Alterman |
| 2008/0082627 | A1 | 4/2008 | Allen et al. |
| 2008/0091777 | A1 | 4/2008 | Carlos |
| 2008/0097871 | A1 | 4/2008 | Williams et al. |
| 2008/0104496 | A1 | 5/2008 | Williams et al. |
| 2008/0140775 | A1 | 6/2008 | Lee et al. |
| 2008/0141141 | A1 | 6/2008 | Moore et al. |

| | | | |
|---|---|---|---|
| 2008/0141153 A1 | 6/2008 | Samson et al. | |
| 2008/0168245 A1 | 7/2008 | De Atley et al. | |
| 2008/0168391 A1 | 7/2008 | Robbin et al. | |
| 2008/0222232 A1 | 9/2008 | Allen et al. | |
| 2008/0222295 A1 | 9/2008 | Robinson et al. | |
| 2008/0222658 A1 | 9/2008 | Allen et al. | |
| 2008/0319856 A1 | 12/2008 | Zito et al. | |
| 2009/0013058 A1 | 1/2009 | Chan | |
| 2009/0024943 A1 | 1/2009 | Adler et al. | |
| 2009/0037509 A1 | 2/2009 | Parekh et al. | |
| 2009/0070409 A1 | 3/2009 | Clayton et al. | |
| 2009/0094339 A1 | 4/2009 | Allen et al. | |
| 2009/0111448 A1 | 4/2009 | Paila | |
| 2009/0180412 A1 | 7/2009 | Albert et al. | |
| 2009/0204885 A1 | 8/2009 | Ellsworth et al. | |
| 2009/0216634 A1 | 8/2009 | Peltonen et al. | |
| 2009/0265213 A1 | 10/2009 | Hyman et al. | |
| 2009/0288004 A1 | 11/2009 | Strandell et al. | |
| 2010/0030901 A1 | 2/2010 | Hallberg et al. | |
| 2010/0100605 A1 | 4/2010 | Allen et al. | |
| 2010/0100626 A1 | 4/2010 | Allen et al. | |
| 2010/0138295 A1 | 6/2010 | Caron et al. | |

FOREIGN PATENT DOCUMENTS

| | | |
|---|---|---|
| EP | 1942422 A1 | 7/2008 |
| JP | 2005-346434 A | 12/2005 |
| WO | WO 01/86384 A2 | 11/2001 |
| WO | WO 02/21404 A1 | 3/2002 |
| WO | WO 2006/028488 A2 | 3/2006 |
| WO | WO 2008/052013 A2 | 5/2008 |
| WO | WO 2008/060828 A2 | 5/2008 |

OTHER PUBLICATIONS

Daily Flash Performance Report :: MochiBot.com Traffic Report Tour [online], [retrieved on Jan. 11, 2006]. Retrieved from the Internet: <URL: http://www.mochibot.com/tour_trafficreport.html>. (2 pgs).

Final Office Action mailed Jul. 8, 2010 for U.S. Appl. No. 11/537,362, filed Sep. 29, 2006.

Final Office Action mailed Jul. 8, 2010 for U.S. Appl. No. 11/682,626, filed Mar. 6, 2007.

Flash Traffic Analysis for a SWF :: MochiBot.com SWF Detail Tour [online], [retrieved on Jan. 11, 2006]. Retrieved from the Internet: <URL: http://www.mochibot.com/tour_swfdctail.html>. (2 pgs).

International Search Report and Written Opinion for International Application No. PCT/US08/78744, mailed Jan. 12, 2009, 9 pages.

International Search Report and Written Opinion mailed Apr. 18, 2008 for International Application No. PCT/US07/80086, 9 pages.

International Search Report and Written Opinion mailed Aug. 1, 2008 for International Application No. PCT/US08/55756, 7 pages.

International Search Report and Written Opinion mailed Jul. 25, 2008 for International Application No. PCT/US08/55755, 8 pages.

MochiBot, "It's 3a.m. Do you know where your Flash content is?", Flash tracking, Traffic Monitoring, and Analytics Service [online], [retrieved on Jan. 11, 2006]. Retrieved from the Internet: <URL: MochiBot.com, http://www.mochibot.com>. (4 pgs).

Office Action mailed Dec. 10, 2009 for U.S. Appl. No. 11/537,362, filed Sep. 29, 2006.

Office Action mailed Jan. 11, 2010 for U.S. Appl. No. 11/682,626, filed Mar. 6, 2007.

Office Action mailed Jul. 7, 2010 for U.S. Appl. No. 11/537,375, filed Sep. 29, 2006.

Office Action mailed Jun. 18, 2009 for U.S. Appl. No. 11/682,626, filed Mar. 6, 2007.

Office Action mailed Jun. 22, 2010 for U.S. Appl. No. 12/244,606, filed Oct. 2, 2008.

Office Action mailed Sep. 1, 2010 for U.S. Appl. No. 11/682,639, filed Mar. 6, 2007.

Overview of the SWFs you are tracking :: MochiBot.com Dasboard Tour [online], [retrieved on Jan. 11, 2006]. Retrieved from the Internet: <URL: http://www.mochibot.com/tour_dashboard.html>. (2 pgs).

See who's hosting your SWF :: MochiBot.com Host Report Tour [online], [retrieved on Jan. 11, 2006]. Retrieved from the Internet: <URL: http://www.mochibot.com/tour_hostreport.html>. (2 pgs).

Snipperoo Web Widgets, Snipperoo Universal Widget [online], [retrieved on Jan. 11, 2006]. Retrieved from the Internet: <URL: http://www.snipperoo.com/>. (1 pg).

Supplementary European Search Report for European Patent Application No. 07843614.4, mailed Aug. 30, 2010.

Widgetbox, Widgetizing the Web [online], [retrieved on Jan. 11, 2006]. Retrieved from the Internet: <URL: http://widgetbox.com>. (3 pgs).

Daniel Salber, Anind K. Dey, Gregory D. Abowd, "The context toolkit: aiding the development of context-enabled applications", Proceedings of the SIGCHI conference on Human factors in computing systems: the CHI is the limit, p. 434-441, May 15-20, 1999 [retrieved from the ACM database on Jun. 15, 2010].

Tody, D. A portable GUI Development System—The IRAF Widget Server, Astronomicla Data Analysis Software and Systems IV; ASP Conference Series, vol. 77, 1995 [retrieved from the Internet "http://articles.adsabs.harvard.edu/cgi-bin/nph-iarticle_query?1995ASPC...77...89T&defaultprint=YES&filetype=.pdf" on Jun. 15, 2010].

Luyten, K., and Coninx, K., Uiml.net: an Open Uimi Renderer for the .Net Framework, in R. Jacob, Q. Limbourg, J. Vanderdonckt (eds.), Proc. of 5th Int. Conf. of Computer-Aided Design of User Interfaces CADUI'2004. Jan. 2004. Information Systems Series, Kluwer Academics, Dordrecht, 2005, pp. 259-270. [retrieved from the internet Jun. 15, 2010].

Final Office Action mailed Feb. 16, 2011 for U.S. Appl. No. 11/537,375, filed Sep. 29, 2006.

Office Action mailed Mar. 16, 2011 for U.S. Appl. No. 12/244,606, filed Oct. 2, 2008.

Office Action mailed Apr. 13, 2011 for U.S. Appl. No. 11/682,639, filed Mar. 6, 2007.

Office Action mailed Jun. 13, 2011 for U.S. Appl. No. 12/560,127, filed Sep. 15, 2009.

Office Action mailed Jun. 13, 2011 for U.S. Appl. No. 12/560,159, filed Sep. 15, 2009.

Schulte, Window Programming in Mozart, (Jan. 25, 2003) http://graubart.rz.ifi.lmu.de/programming/mozart/print/tutorial/WindowProgramming.pdf.

Ryu et al. Widget Integration Framework for Context-Aware Middleware, MATA 2005, LNCS 3744, Springer-Verlag, 2005, pp. 161-171.

Goland et al., Simple Service Discovery Protocol, <draft-cai-ssdp-v1-03.txt>, 1999.

Amulet Technologies, Inter-Widget Communication, 2004, http://web.mit.edu/6.115/www/miscfiles/amulet/amulet-help/IWC.htm.

G. Klinker, Augmented Reality II—Context Toolkit, May 27, 2003.

Liscano & Ghavam, Context Awareness and Service Discovery for Spontaneous Networking, School of Information Technology and Engineering (SITE), University of Ottawa, Ottawa, Ontario, (2003).

Wang et al., Grid-based Collaboration in Interactive Data Language Applications, Proceedings of the International Conference on Information Technology: Coding and Computing, IEEE (2005).

* cited by examiner

METHOD AND APPARATUS FOR DATA PROCESSING

CROSS-REFERENCE AND RELATED APPLICATIONS

This application claims priority to the commonly owned U.S. Provisional Application Ser. No. 60/893,330, entitled "Method and Apparatus for Data Processing," filed Mar. 6, 2007, and U.S. Provisional Application Ser. No. 60/977,544, entitled "Methods and Apparatus for Widget Sharing Between Content Aggregation Points," filed Oct. 4, 2007, both of which are incorporated herein by reference in their entireties.

BACKGROUND

The disclosed method and apparatus relate generally to the processing of information received via a network and more particularly to the collection and manipulation of information related to content distributed over networks.

The world wide web is a platform that has been used to exchange various forms of content including videos, text, music, etc. Often this content is distributed to users and/or computers in an ad-hoc fashion, for example, using e-mail or as files embedded in a web page. Recently, primitive forms of "viral" distribution and/or replication of content have been developed that allow users to more easily spread content to other users than previously known ad-hoc methods. Although these primitive methods are more convenient than distributing content in an ad-hoc fashion, they have many shortcomings. For example, they do not provide for the ability to easily add services related to the content and services, if any exist, cannot be dynamically modified. The spreading of content using ad-hoc methods and/or primitive forms of viral spreading cannot be tracked as a service in a useful and efficient way. Moreover, limitations in the ability to track spreading content and to efficiently process any information that can be tracked also limits the ability to dynamically modify behavior associated with the content. Content also cannot be readily shared with users of different platforms (e.g., personal digital assistant to personal computer).

Thus, a need exists for efficiently collecting and manipulating information related to content distributed to users and/or computers.

SUMMARY

A method includes multiple data handling stages for manipulating tracked information associated with content that has been distributed to users and/or computers, such as static objects, media objects, and/or software objects, for example. The content can be distributed as widget instances and the associated tracked information can be received over a network. The information received can be associated with a session corresponding to each widget instance and/or with multiple identifiers, such as widget, user, content, session, content aggregation point, processor, and/or placement identifiers, for example. Data handling processes, including sorting, storing, filtering, combining, queuing, and/or authenticating, for example, can be performed during the data handling stages. The processed information can be used to determine modifications to a behavior associated with widgets and/or widget containers.

BRIEF DESCRIPTION OF THE DRAWINGS

The disclosed method and apparatus are described with reference to the accompanying drawings. In the drawings, identical or like reference numbers indicate identical or functionally similar elements.

DETAILED DESCRIPTION

Figure 1A:
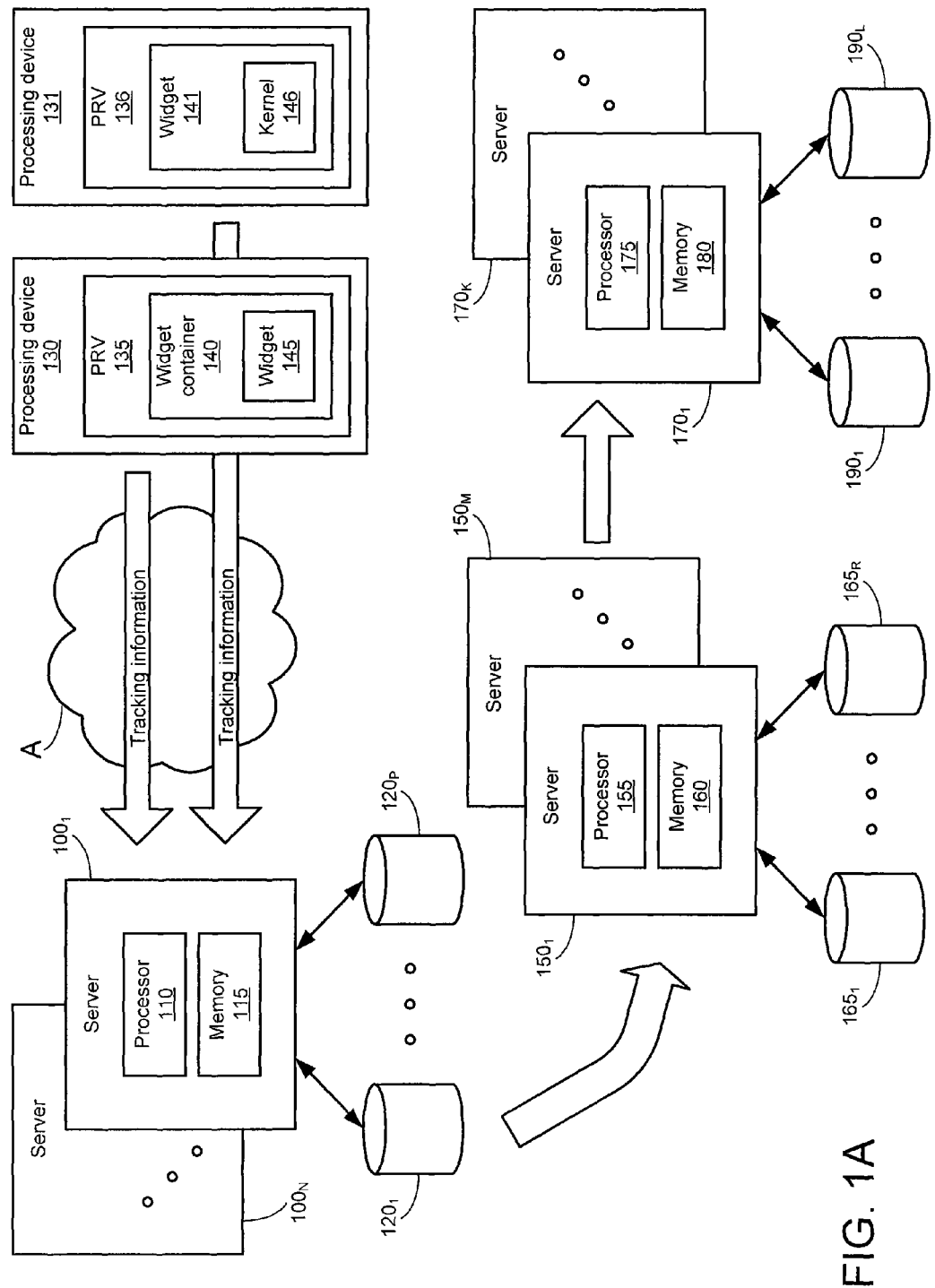
FIG. 1A is a schematic diagram of a system configured to handle tracking information received from one or more instances of widgets.

A widget container (also can be referred to as a container) is a procedural software framework that contains a widget and/or contains at least one service module that can be associated with the widget. As a procedural software framework, the widget container can be a series of instructions that are executable or interpretable by, for example, a computer processor. The widget and/or service module is "contained" in the widget container when a widget and/or service module is either referenced in a widget container or actually integrated into the procedural software framework of the widget container. The widget and/or service module when being contained in the widget container can be referred to as being wrapped or containerized in the widget container.

The widget container can be a portable framework that can be embedded in (e.g., referenced using an embed or object tag) and/or accessed from/using, for example, a processor-readable vehicle (e.g., webpage) and/or a content aggregation point. A content aggregation point can be, for example, managed by (e.g., hosted at, served from) and/or executed at the network entity and can be, for example, a desktop, a start page, a wireless application protocol (WAP) gallery, a gallery, a webpage, a processor-readable vehicle, a portal, and/or a directory. The widget can be any type of object such as a static data object (e.g., a text-based object), a media object (e.g., a video, an mp3, or an image), and/or a software object (e.g., a javascript applet, a rich media object) that can be contained (e.g., integrated or referenced) in the widget container. In many embodiments, the widget and/or the service module (or references to the widget and/or service module) can be referred to as components of the widget container.

The service module (or reference to the service module) contained in the widget container can be a pre-defined and/or customizable (e.g., user-defined) function related to a variety of functions (e.g., tracking, placing) related to the widget container and/or its components. The service module and/or widget can be wrapped in the container, for example, at the time that the widget container is first generated, after the widget container has been generated, and/or dynamically when the widget container is being served. The widget container can be produced using a widget generation engine that can be implemented in hardware and/or software. In some embodiments, the widget generation engine can be controlled using, for example, a user-interface. In some embodiments, the widget container generation engine can be included in a widget container host and/or a widget container creation device. In some embodiments, the widget container can be dynamically modified using dynamic injection (i.e., injecting data into the widget container just before/when the widget container is served).

In some embodiments, the functions typically associated with the widget container and/or the functions typically associated with the service module can be invoked by a widget. In some embodiments, these functions can be invoked by a widget that is not contained in a widget container. For example, in some embodiments, these functions can be invoked at a server by a widget via, for example, an application programming interface (API). In some embodiments, these functions can be stand-alone applications that can be triggered to execute by a widget that may not be contained in a widget container. In some embodiments, the functions associated with the widget container and/or the functions associated with the service module can be included in and/or executed at a widget. In some embodiments, these functions can be referred to as kernel functions and the widget can be referred to as a kernel-containing widget.

The widget container or the widget (which can be configured to invoke a kernel) can be sent from a host to a processing device such as, for example, a computer or mobile phone when a reference to the widget container or to the widget is accessed from, for example, a webpage, a WAP page, a WAP gallery, etc. The widget container or the widget can be executed on various platforms and instances of references to the widget container or to the widget can be included in and/or spread to a variety of processor-readable vehicles (e.g., web browser) that can be read using various processing devices. Also, metadata can be associated with the widget container or the widget and/or associated with a component of the widget container or with a component of the widget, so that the widget container or the widget and/or the component of the widget container or the component of the widget can be, for example, dynamically customized and/or tracked. More details related to placement of a widget container and/or platform adaptation of a widget are set forth in co-pending application Ser. No. 11/682,626, "Method and Apparatus for Widget and Widget-Container Platform Adaptation and Distribution," which is incorporated herein by reference in its entirety.

After a widget and/or widget container (which can contain the widget) is sent to a processing device, tracking information (e.g., widget type, user information, placement information, session information, etc.) that is collected before, during, or after the widget and/or widget container are executed at the processing device can be sent from the widget to a computing entity (e.g., set of servers). The computing entity can be configured to collect such tracking information associated with multiple widgets and/or widget containers. The widgets and/or widget containers, can be, for example, instances of widgets and/or widget containers that have been virally spread. The tracking information can be used to, for example, dynamically modify the behavior of widgets and/or widget containers that have been distributed and/or are currently executing. The tracking information can also be used to, for example, modify the behavior of subsequently shared instances of widgets and/or widget containers. The sharing of an instance of a widget can be triggered by a sharing request. In some embodiments, the sharing request can be a widget precursor. The tracking information can be collected and/or transmitted using a tracking kernel.

Figure 1B:
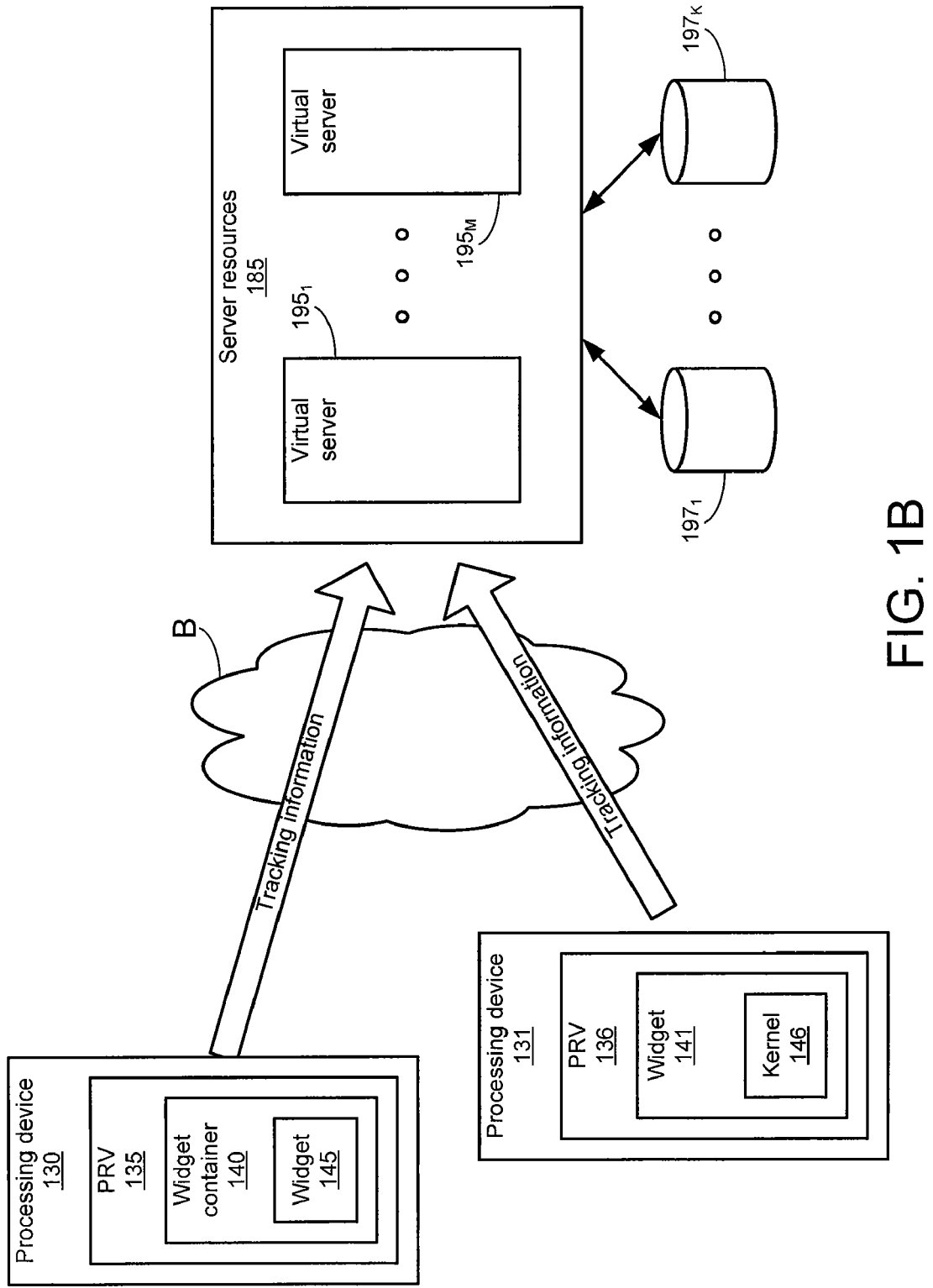
FIG. 1B is a schematic diagram of a system having virtual servers for handling tracking information received from one or more instances of widgets.
Figure 8:
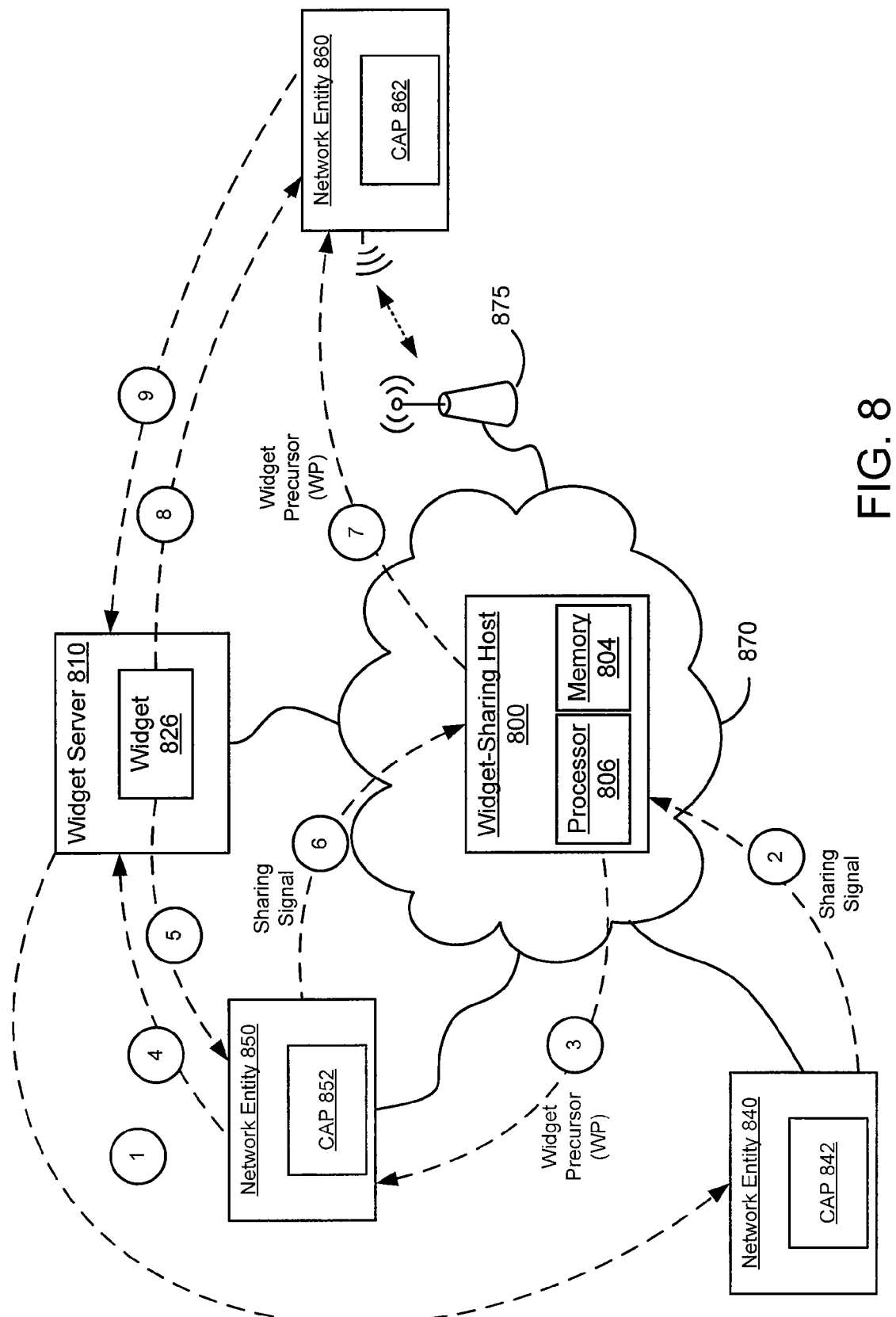
FIG. 8 is a schematic block diagram that illustrates a widget-sharing host configured to control sharing of a widget between network entities within a network.
Figure 9:
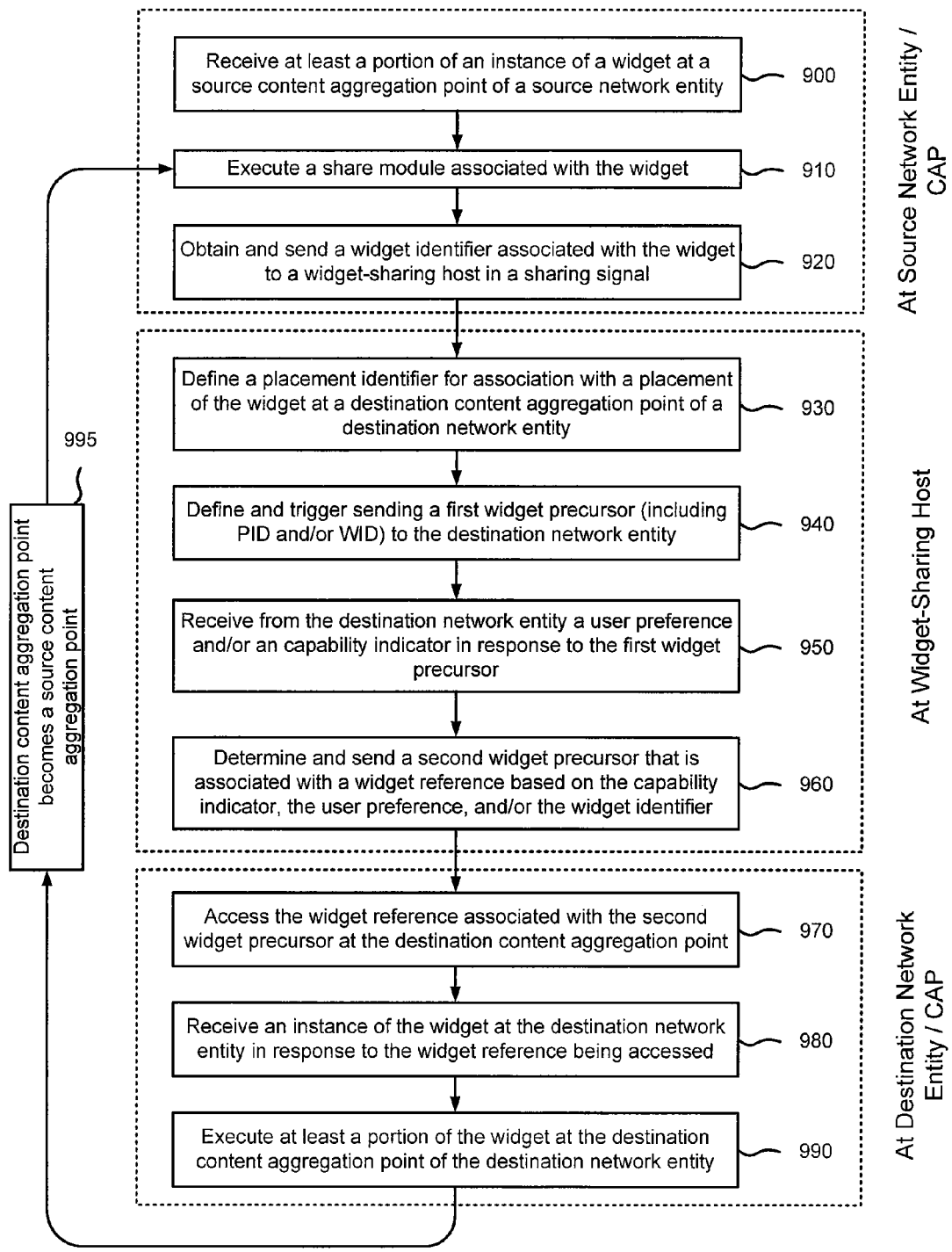
FIG. 9 is a flowchart that illustrates a method for sharing a widget between a source content aggregation point and a destination content aggregation point based on a series of widget precursors.

The tracking information can be processed using various systems, such as those shown in FIGS. 1A and 1B, and using various algorithms, such as those shown in FIGS. 2 through 7. FIGS. 8 and 9 illustrate mechanisms (methods and apparatus) for sharing widgets from which tracking information can be collected. In some embodiments, the processing can be performed at one or more stages (e.g., a primary processing stage and a secondary processing stage; a receiving stage, a processing stage, and a modifying stage). The stages can be associated with a data handling module and/or one or more computing entities. The processing can include, for example, ordering, receiving, queuing, coalescing, sorting, parsing, buffering, authenticating, associating with domain buckets, filtering, and so forth.

In this written description and the appended claims, the singular forms "a," "an" and "the" include plural referents unless the context clearly dictates otherwise. Thus, for example, the term "an identifier" is intended to mean a single identifier or a combination of identifiers.

FIG. 1A is a schematic diagram of a system configured to handle tracking information received from one or more instances of widgets. FIG. 1A depicts servers $100_1, \ldots, 100_N$, servers $150_1, \ldots, 150_M$, and servers $170_1, \ldots, 170_K$ for handling tracking information received from one or more instances of widgets that have been distributed with users and/or computers. Each of the servers $100_1, \ldots, 100_N$ can include a processor 110 and a memory 115. Similarly, each of the servers $150_1, \ldots, 150_M$ and the servers $170_1, \ldots, 170_K$ can include a processor 155 and a memory 160, and a processor 175 and a memory 180, respectively. Each of the servers shown can be configured to be coupled to a data storage medium. As shown in FIG. 1A, the server $100_1$ can be coupled to data storage mediums $120_1, \ldots, 120_P$. Similarly, the servers $150_1$ and $170_1$ are shown coupled to data storage mediums $165_1, \ldots, 165_R$, and $190_1, \ldots, 190_L$, respectively.

The processors 110, 155, and/or 175 can include software-based modules (e.g., set of instructions executable at a processor, software code) and/or hardware-based modules (e.g., circuit system, processor, application-specific integrated circuit (ASIC), field programmable gate array (FPGA)) for handling (i.e., receiving, processing, manipulating, or modifying) tracking information. The memories 115, 160, and/or 180 can include a machine-readable storage medium, such as an integrated circuit (IC) memory, for example, that can be configured to store data at various stages of handling. The data storage mediums $120_1, \ldots, 120_P, 165_1, \ldots, 165_R$, and $190_1, \ldots, 190_L$ can correspond to, for example, databases for storing, collecting, and/or organizing information associated with the tracked information received from distributed instances of widgets. The data storage mediums $120_1, \ldots, 120_P, 165_1, \ldots, 165_R$, and $190_1, \ldots, 190_L$ can also correspond to, for example, databases (e.g., remote database, distributed database, relational database) having additional information that can be used when processing the tracked information or tracking information, such as, for example, third-party data. The additional information can be, for example, metadata such as user-defined information associated with a user profile associated with a widget or a particular instance of a widget. The additional information can be a subset of tracking information. In some embodiments, the additional information can be collected asynchronously from the tracking information (e.g., in between tracking information packet bursts).

FIG. 1A also shows a processing device 130 that includes a processor-readable vehicle (PRV) 135 (e.g., a desktop, a web browser) that has a framework for executing a widget container 140. The widget container 140 is associated with an instance of widget 145 that can be rendered at a content aggregation point (e.g., webpage, desktop). Also shown is a processing device 131 displaying a processor-readable vehicle 136 that has a framework for executing a kernel 146 within the instance of widget 141. The processing device 130 can be any type of device that is configured to process the widget container 140 and the instance of widget 145 and/or a service module (not shown) that can be contained in the widget container 140. Similarly, the processing device 131 can be any type of device that is configured to process the instance of widget 141 and the kernel 146 contained within the instance of widget 141. Each of the processing devices 130 and 131 can be, for example, a computer, a mobile phone, a personal digital assistant (PDA), and/or a server. The widget container 140 or the instance of widget 141 containing the kernel 146 can be configured so as to be processed by a processing device even though the platforms (e.g., hardware, architecture, software, operating system, runtime libraries, programming languages) of processing devices may be different.

A service module (not shown) included in the widget container 140 and/or included in the kernel 146 can be configured to transmit or communicate tracking information associated with the instance of widget 145 and 141, respectively, to at least a specified portion of the servers $100_1, \ldots, 100_N$ via the network A. In this regard, the service module included in the widget container 140 and/or included in the kernel 146 can be configured before the associated widget is loaded, at the time the widget is loaded, when the widget is rendered, at the request of the widget, and/or dynamically after the widget is loaded.

The tracking information can include various types of information, such as, but not limited to, widget information such as widget type (e.g., video player, image), user information (e.g., username, user behavior, sex of user), content information such as the type of content in the widget (e.g., personal video, shared video), placement information (e.g., sharing lineage or parentage), session information (e.g., widget session activity, session identifier), content aggregation point information (e.g., webpage characteristics, browser, browser type), and processor information related to a processor type (e.g., Intel, Motorola, ARM).

Each type of tracking information can be associated with a variety of identifiers. For example, widget information can be associated with a widget identifier, user information can be associated with a user identifier, content information can be associated with a content identifier, placement information can be associated with a placement identifier, session information can be associated with a session identifier, content aggregation point information can be associated with a content aggregation point identifier, and processor information can be associated with a processor identifier. Each of these identifiers can indicate a category or sub-category of the corresponding tracking information. The tracking information can correspond to usage, behavior, performance, characteristics, and/or activities associated with the instances of the widgets and/or the processing devices. One or more of the identifiers can be associated with a group of tracking information transmitted to, for example, the servers $100_1, \ldots, 100_N$ at, for example, a specified interval of time.

The network A can be any type of network such as a local area network (LAN), a wide area network (WAN), and/or a metropolitan area network (MAN) implemented as a wired and/or wireless network in a variety of environments such as, for example, an office complex or a campus. In some instances, the network A can include more than one network that collectively provides a path for the tracking information to be transmitted and/or communicated from processing devices (e.g., the processing devices 130 and 131) to at least a portion of the servers $100_1, \ldots, 100_N$.

In some embodiments, the servers $100_1, \ldots, 100_N$ can be configured to perform a first portion of handling the tracking information, the servers $150_1, \ldots, 150_M$ can be configured to perform a second portion of the handling of tracking information, and the servers $170_1, \ldots, 170_K$ can be configured to perform a third portion of handling the tracking information. In this regard, the servers can be referred to as computing entities or computing devices that may perform one or more digital computations or operations related to processes for handling tracking information.

In some embodiments, the output of the processes performed by the servers $100_1, \ldots, 100_N$ can be sent to and received by the servers $150_1, \ldots, 150_M$. Similarly, the output of the processes performed by the servers $150_1, \ldots, 150_M$ can be sent to and received by the servers $170_1, \ldots, 170_K$. In some embodiments, only a subset or a portion of the servers $100_1, \ldots, 100_N$, the servers $150_1, \ldots, 150_M$, and the servers $170_1, \ldots, 170_K$ can be used for one or more portions of the handling of the tracking information. For example, handling the tracking information can be performed by a subset or a portion of the servers $100_1, \ldots, 100_N$ and the servers $170_1, \ldots, 170_K$. In this regard, a communication path (not shown) can exist between the servers $100_1, \ldots, 100_N$ and the servers $170_1, \ldots, 170_K$ that does not include the servers $150_1, \ldots, 150_M$, for example.

In another aspect of the example shown in FIG. 1A, the widget container 140 and the kernel 146 can be configured to communicate tracking information to a specified subset or portion of the servers $100_1, \ldots, 100_N$. This can be referred as session slaving or as a master-slave relationship. For example, in some embodiments, the widget container 140 and the kernel 146 can be configured to communicate only with a pre-determined subset of the servers $100_1, \ldots, 100_N$. The widget container 140 and the kernel 146 can be configured to communicate with the pre-determined subset based on a mapping. In some embodiments, a mapping can be provided (e.g., defined) that identifies the servers $100_1, \ldots, 100_N$ with which instances of a widget, widget containers, and/or kernels can communicate. Similarly, each of the servers $100_1, \ldots, 100_N$ may be configured to communicate only with a pre-determined subset of the servers $150_1, \ldots, 150_M$, and each of the servers $150_1, \ldots, 150_M$ may be configured to communicate only with a pre-determined subset of the servers $170_1, \ldots, 170_K$. Again, a mapping can be provided that indicates which servers can communicate with which other servers.

FIG. 1B is a schematic diagram of a system having virtual servers configured to handle tracking information received from one or more instances of widgets. FIG. 1B depicts the processing devices 130 and 131 described in FIG. 1A sending (e.g., communicating) tracking information to server resources 185 via a network B. The server resources 185 can include one or more processors (not shown) and one or more memories (not shown). The processors and/or memories in the server resources 185 can be substantially similar to the processors 110, 155, and 175, and the memories 115, 160, and 180, described in FIG. 1A. The server resources 185 can be coupled to data storage mediums $197_1, \ldots, 197_K$. The network B can be any type of network or combination of networks that can include, for example, a LAN, WAN, and/or MAN. In some instances, the network B can include more than one network that collectively provide a path for the tracking information to be transmitted or communicated from the processing devices 130 and 131 to the server resources 185.

The server resources 185 can be configured to operate as one or more virtual servers $195_1, \ldots, 195_M$, for example. Server virtualization can simplify the interface between users and server resources, particularly when the server resources include multiple individual physical servers, processors, and operating systems. A server administrator can use a software application to divide one physical server into multiple, isolated virtual environments. The virtual environments can be referred to as virtual private servers, partitions, guests, instances, containers, or emulations. Server virtualization can be achieved by using a virtual machine model, a paravirtual machine model, or a virtualization at the operating system (OS) layer.

The virtual servers $195_1, \ldots, 195_M$, can be configured to perform operations and/or processes related to handling tracking information received from instances of widgets via the network B. In this regard, the virtual servers $195_1, \ldots, 195_M$ can be organized in various configurations. For example, a first portion of the virtual servers $195_1, \ldots, 195_M$ can be configured to perform a first portion of the handling of tracking information, a second portion of the virtual servers $195_1, \ldots, 195_M$ can be configured to perform a second portion of the handling of tracking information, and a third portion of the virtual servers $195_1, \ldots, 195_M$ can be configured to perform a third portion of the handling of tracking information. As described in FIG. 1A, session-slaving can be supported such that each of the virtual servers $195_1, \ldots, 195_M$ can be configured to communicate with a pre-determined subset (e.g., mapping) of the virtual servers $195_1, \ldots, 195_M$.

Figure 2:
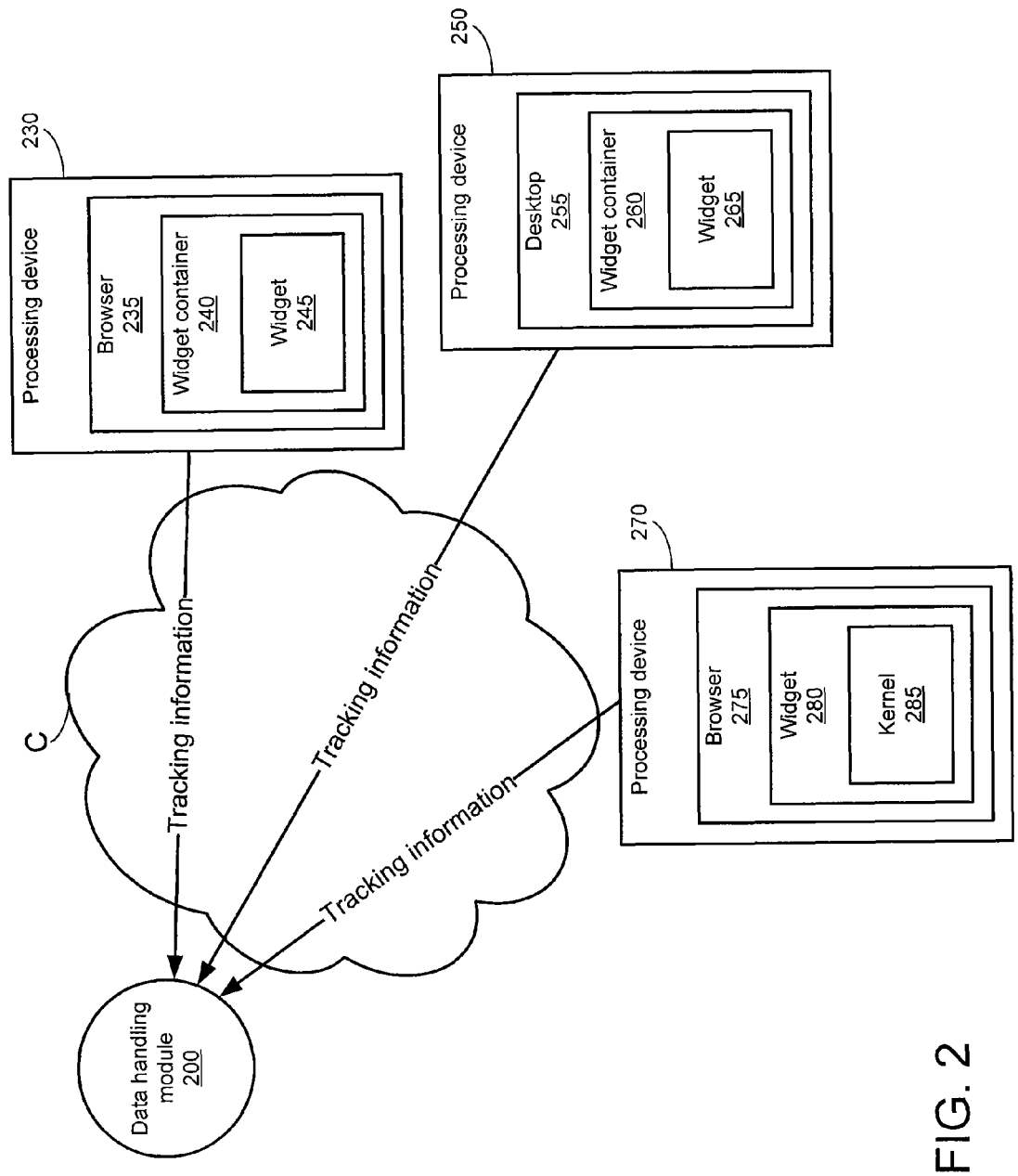
FIG. 2 is a schematic diagram illustrating a data handling module configured to receive tracking information associated with multiple instances of widgets.

FIG. 2 is a schematic diagram illustrating a data handling module 200 configured to receive tracking information associated with multiple instances of widgets. In the example shown in FIG. 2, a data handling module 200 can be configured to receive tracking information from multiple processing devices, such as processing devices 230, 250, and 270, via a network C. The data handling module 200 can include one or more software-based modules (e.g., set of instructions executable at a processor, software code) and/or can include one or more hardware-based modules (e.g., circuit system, processor, application-specific integrated circuit (ASIC), field programmable gate array (FPGA)) to perform stages or processes related to handling tracking information associated with distributed instances of widgets (i.e., distributed content). In this regard, the data handling module 200 can be performed at one or more servers or groups of servers (i.e., computing entities) such as those described in FIGS. 1A and 1B. In some embodiments, the operations/functions performed by the data handling module 200 can be referred to as data handling algorithm(s) and/or data handling operation(s).

The tracked information or tracking information received at the data handling module 200 can be associated with multiple sessions, one session for each of the instances of widgets 245, 265, and 280 in the processing devices 230, 250, and 270, respectively. For example, an active or current session for the instance of widget 245 in the widget container 240 can include tracking information associated with the instance of widget 245. The current session for the instance of widget 245 can be identified using, for example, a widget identifier. The information collected and associated with the active session of the instance of widget 245 can include widget information, user information, session information, placement information, content information, information regarding the content aggregation point (e.g., webpage), information regarding the processor-readable vehicle (e.g., browser 235), and/or information associated with a processor in the processing device 230 (e.g., Intel processor). The information collected and associated with the active session for the instance of widget 245 can be associated with widget identifiers, user identifiers, session identifiers, placement identifiers, content identifiers, content aggregation point identifiers, and/or processor identifiers. The data handling module 200 can receive tracking information associated with the instance of widget 265 and with the instance of widget 280 by having corresponding active widget sessions.

An active session associated with an instance of a widget can remain active until, for example, a predetermined time is reached after a last occurrence of an activity associated with the instance of the widget. An activity timer can be used to determine when an instance of a widget has been inactive for longer than a predetermined threshold time. When the inactivity period is longer than that specified by the threshold time, the current session can become inactive (e.g., expire) or can be terminated. In some embodiments, a new session (e.g., a session with a different identifier) can be established when the activity associated with the instance of the widget later resumes, when the instance of the widget is abnormally terminated, when the instance of the widget is reloaded, or when a new instance of the widget is loaded. In some embodiments, when the widget is terminated, an indicator that the session has been terminated can be received at, for example, a server resource.

Other events that can trigger, cause, or result in the termination of an active widget session are, but need not be limited to, the closing of a content aggregation point into which the instance of the widget has been loaded, a predetermined time is reached (e.g., expired timer) after the instance of the widget is loaded into the content aggregation point, or a signal is sent from the widget container or kernel associated with the instance of the widget to terminate the session.

While the example shown in FIG. 2 depicts a data handling module 200 receiving tracking information from single instances of widgets in processing devices 230, 250, and 270, other embodiments can include instances where the data handling module 200 receives tracking information from multiple processing devices and/or from multiple instances of widgets in a single processing device (not shown).

Figure 3A:
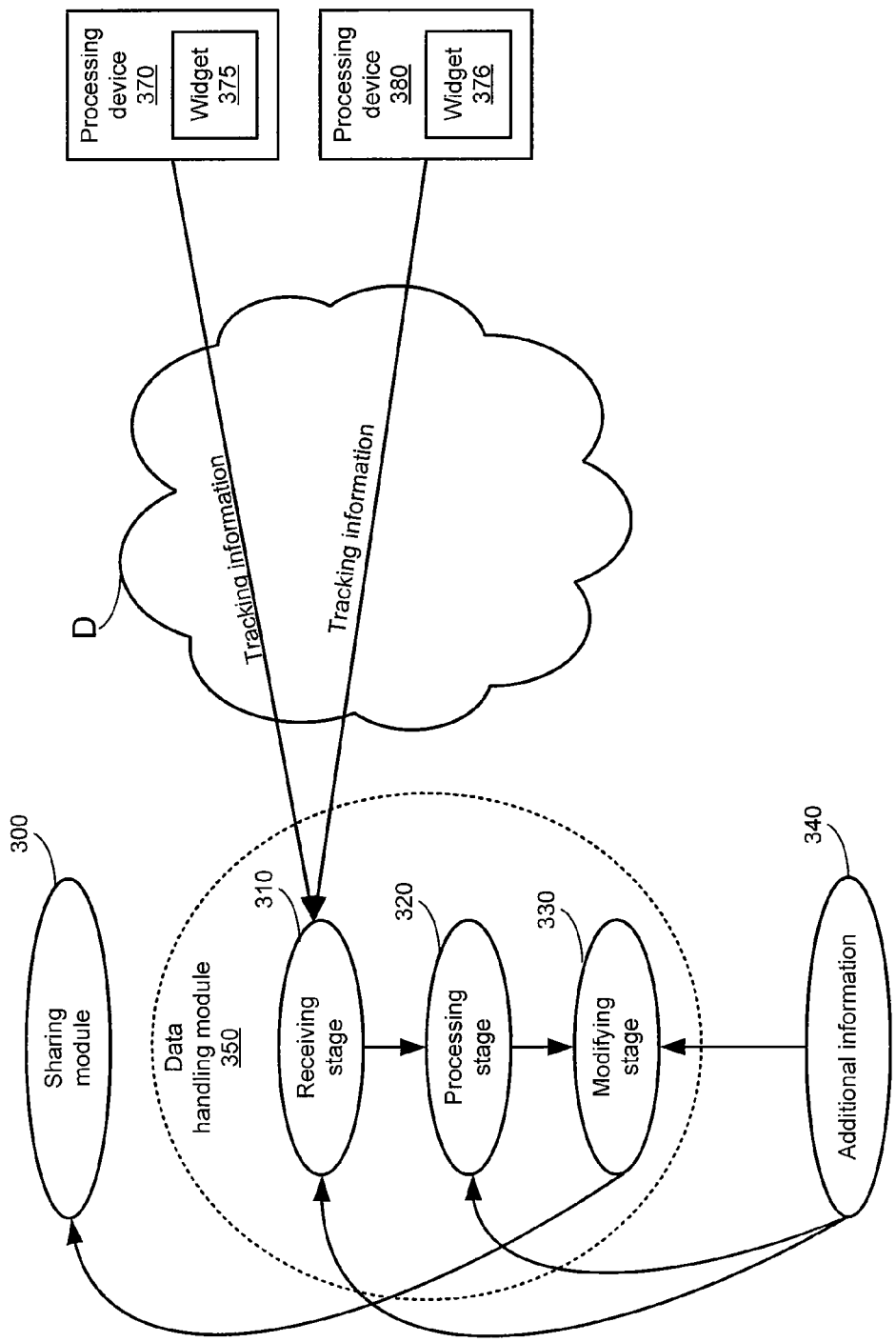
FIGS. 3A-3D are schematic diagrams illustrating a data handling module and a sharing module.

FIGS. 3A-3D are schematic diagrams illustrating a data handling module 350 and a sharing module 300. FIG. 3A illustrates a data handling module 350 configured to receive tracking information from multiple processing devices and multiple instances of widgets. The data handling module 350 can include multiple processing stages. In this example, the data handling module 350 includes a receiving stage 310, a processing stage 320, and a modifying stage 330. The data handling module 350 can be configured to receive additional information 340 (e.g., third-party data) at any of the three stages. The data handling module 350 can be further configured to communicate with a sharing module 300 via the modifying stage 330.

As shown in FIG. 3A, the data handling module 350 can receive tracking information associated with instances of widgets 375 and 376 in processing devices 370 and 380

(widget containers or kernels not shown), respectively, via a network D. The tracking information is received in the receiving stage 310. The output of the receiving stage 310 can be sent to and received by the processing stage 320. Similarly, the output of the processing stage 320 can be sent to and received by the modifying stage 330. In some embodiments, the receiving stage 310, the processing stage 320, and/or the modifying stage 330 can be pipelined processing stages, in which case some amount of buffering may be provided between stages.

In one embodiment, the first stage of the data handling module 350, the receiving stage 310, can be performed by, for example, at least a portion of the servers $100_1, \ldots, 100_N$ described in the system of FIG. 1A. The second stage of the data handling module 350, the processing stage 320, and the third stage of the data handling module 350, the modifying stage 320, can be performed by, for example, at least a portion of the servers $150_1, \ldots, 150_M$ and the servers $170_1, \ldots, 170_K$, respectively. The servers associated with the data handling module 350 can be referred to collectively as "tracking servers," for example. The sharing module 300 can be performed by at least one separate server. In another example, at least a portion of the sharing module 300 can be performed by the servers $170_1, \ldots, 170_K$.

In some embodiments, the receiving stage 310, the processing stage 320, and the modifying stage 330 can be performed by a subset of the servers shown in, for example, FIG. 1A. The sharing module 300 can be performed by at least one separate server or by a subset of the servers shown in, for example, FIG. 1A.

In the embodiments described above, the additional information 340 can be provided to each of the receiving stage 310, the processing stage 320, and/or the modifying stage 330 by storing the content or information in the data storage mediums $120_1, \ldots, 120_P, 165_1, \ldots, 165_R$, and $190_1, \ldots, 190_L$, for example.

In some embodiments, the receiving stage 310, the processing stage 320, and the modifying stage 330 can be performed by virtual servers such as the virtual servers $195_1, \ldots, 195_M$ configured within the server resources 185. In one example, the sharing module 300 can be performed by at least one separate server. In another example, at least a portion of the sharing module 300 can be performed by a subset of the virtual servers $195_1, \ldots, 195_M$. The additional information 340 can be provided to each of the receiving stage 310, the processing stage 320, and/or the modifying stage 330 by storing the content or information in the data storage mediums $197_1, \ldots, 197_K$, for example.

In some embodiments, the functions associated with the receiving stage 310, the functions associated with the processing stage 320, and/or the functions associated with the modifying stage 330 can be combined into one or more stages and/or separated into one or more stages within the data handling module 350 (or a separate module (not shown)). For example, some of the functions associated with the processing stage 320 can be included in and performed at the receiving stage 310 as pre-processing operations. In some embodiments, the functions associated with the modifying stage 330 can be included in and performed at the processing stage 320. In some embodiments, the functions associated with the processing stage 320 can be divided into several processing stages (not shown) that can execute in parallel and/or serially. Furthermore, the functions associated with each of the stages 310, 320, and 330 can be implemented at a single server or at multiple servers.

Figure 3B:
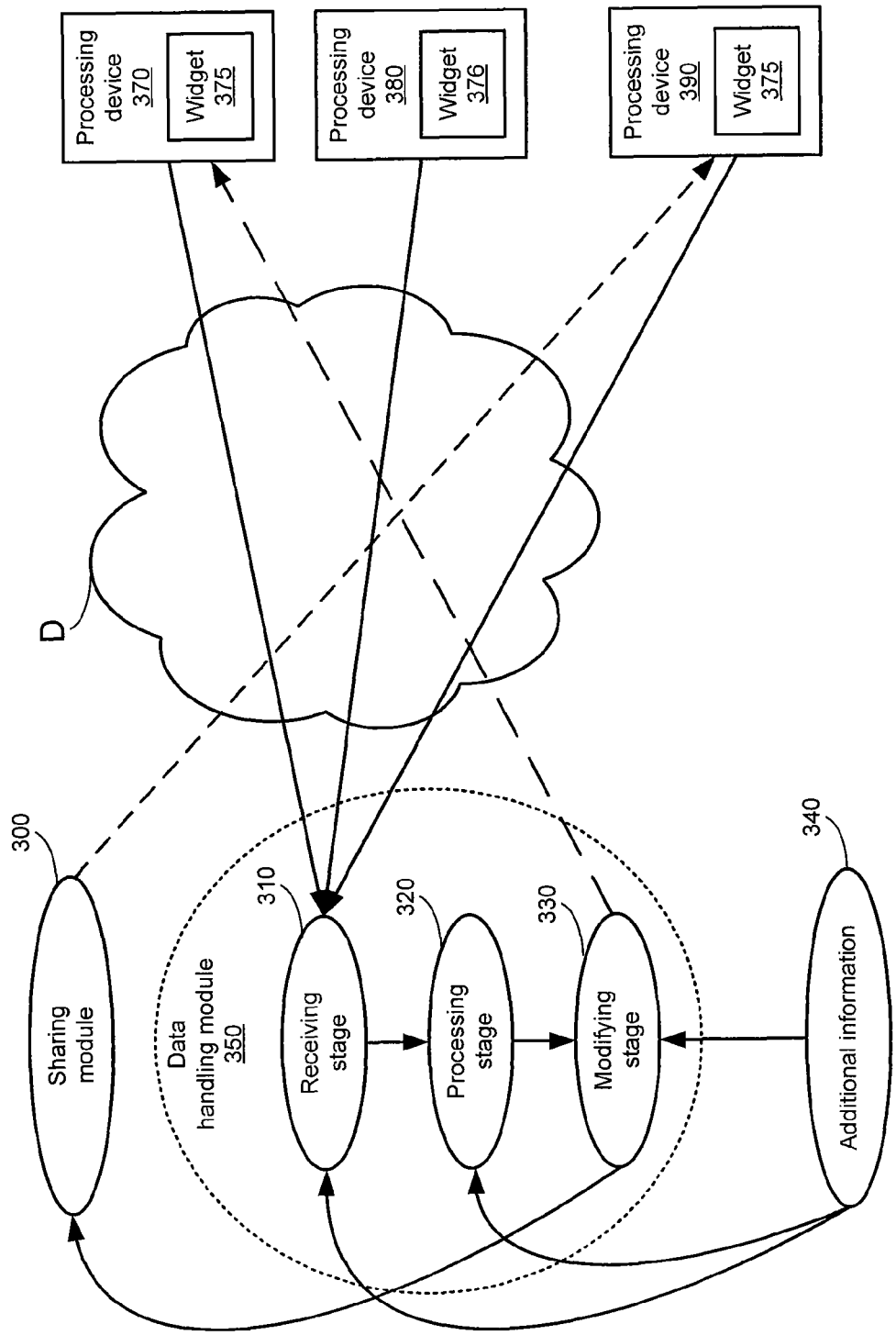

FIG. 3B depicts the modifying stage 330 updating a behavior associated with the current instance of widget 375 in the processing device 370, and the sharing module 300 updating a behavior associated with a shared instance of widget 375 in a processing device 390. In this example, the receiving stage 310 of the data handling module 350 may have received tracking information associated with the instances of widgets 375 and 376 in the processing devices 370 and 380, respectively. The tracked or tracking information received can be further processed in the processing stage 320. The processing stage 320 can include analyzing the tracking information to determine, for example, historical trends, projections, correlations, and/or statistical calculations related to the instances of widgets from which tracking information has been collected. The analysis can include, for example, third-party information provided from the additional information 340. The processed information can be utilized to update content distributed to users and/or computers and/or to update content to be shared with users and/or computers in a desirable manner.

After operations have been performed at the processing stage 320, the processed data can be used at the modifying stage 330 to determine the manner in which behavior associated with currently distributed and/or subsequently distributed instances of widgets is to be modified. For example, the modifying stage 330 can be configured to use the processed data from the processing stage 320 to trigger a modification of a behavior or an update of a behavior associated with the widget 375 in the processing device 370. In other words, tracked information collected from a first instance of a widget being executed at a processing device can be used to modify a behavior of a second instance of the widget (the same widget) at a different processing device or the same processing device. In some embodiments, tracked information collected from an instance of a first widget being executed at a processing device can be used to modify a behavior of an instance of a second widget (a different widget) at a different processing device or the same processing device.

In some embodiments, an indicator or signal can be sent from the modifying stage 330 to, for example, processing device 370 to trigger a change in the widget 375 while the widget 375 is being executed/rendered at the processing device 370. In some embodiments, the indicator or signal can include information that is injected into the widget 375 and/or processing device 370 to trigger modification of a behavior associated with the widget 375.

In another example, the modifying information (produced at the modifying stage 330) can be communicated (e.g., sent, pushed) to the sharing module 300, which can then trigger (e.g., via an indicator/signal) a modification or an update of a behavior associated with an instance of widget 375 shared with the processing device 390.

In some embodiments, an indicator or a signal sent from the modifying stage 330 can be sent to a widget server (not shown). The indicator or signal can trigger (e.g., trigger via an instruction encoded within the indicator or signal) the behavior of the widget 375 to be modified at the widget server before the widget 375 is delivered to the processing device 390.

In some embodiments, data defined at the modifying stage 330 based on tracking information processed at the processing stage 320 can be sent to, for example, processing device 370. The data defined at the modifying stage 330 can be used to by the processing device to implementation a behavior modification of the widget 375. In other words, the widget 375 can invoke a function based on the data received from the modifying stage 330 to implement a behavior modification.

Modifying the behavior associated with instances of widgets can include, but need not be limited to, modifying the content, usage or placement characteristics, and/or operation of associated widget containers or kernels. Behavior modification can also include performance optimization of specified characteristics associated with specified widget instances (e.g., targeted advertisement based on usage). Moreover, the shared instance of widget 375 at processing device 390 can be configured to send (e.g., communicate) tracking information to the receiving stage 310 of the data handling module 350. In this regard, tracking information can be continuously received and processed (at specified time intervals and/or randomly), which can result in a continuous update or modification of behavior associated with instances of widgets at other processing devices (e.g., processing device 370). In some embodiments, the data handling module 350 can be configured to pull the tracking information from widgets (e.g., via a tracking information request).

In some embodiments, an indicator or signal can be sent from the modifying stage 330 to, for example, a widget server (not shown) to trigger the widget server to send a different widget (not shown) to processing device 370 than widget 375. In some embodiments, the widget server can be configured with intelligence to serve a particular widget based on the indicator or signal defined by the modifying stage 330. The different widget can be selected based on the tracking information as it is processed by the data handling module 350. In other words, a different widget can be delivered into the processing device 370 based on the analysis at the data handling module 350 of the tracking information. In some embodiments, the indicator or signal can be a reference to a widget that is different than widget 375, in which case a different widget would be request by, sent to, and executed by processing device 370.

In some embodiments, a widget that is an advertisement or contains an advertisement can be dynamically modified. In other words, the behavior of the widget/advertisement can be dynamically modified. A shared instance of an advertisement can be dynamically modified, for example, from an advertisement with a white vehicle model to an advertisement with a blue vehicle model. This behavior modification can be triggered while the advertisement is currently being displayed. Another example can be to change the content of a video player widget with a video that corresponds to the demographics of the viewer and/or user (e.g., update music videos to those appropriate to the viewer's demographics). In yet another example, an instance of a different widget can be shared and loaded onto the same content aggregation point of an already distributed/displayed instance of a widget based on correlations between the two widgets that resulted from the processing of tracking information (e.g., a video player playing a basketball game highlight added to same webpage having a widget displaying the basketball league's current standings). The modification can occur before the instance of the widget is loaded, at the time the instance of the widget is loaded, when the instance of the widget is rendered, at the request of the instance of the widget, or dynamically after the instance of the widget is loaded.

In this example, the behavior modification may not result in modifications to the behavior associated with the instance of widget 376 at the processing device 380. The behavior of the current instance of widget 375 at the processing device 380 and of the shared instance of widget 375 at the processing device 390, however, can be modified as a result of the processing performed at the data handling module 350.

Figure 3C:
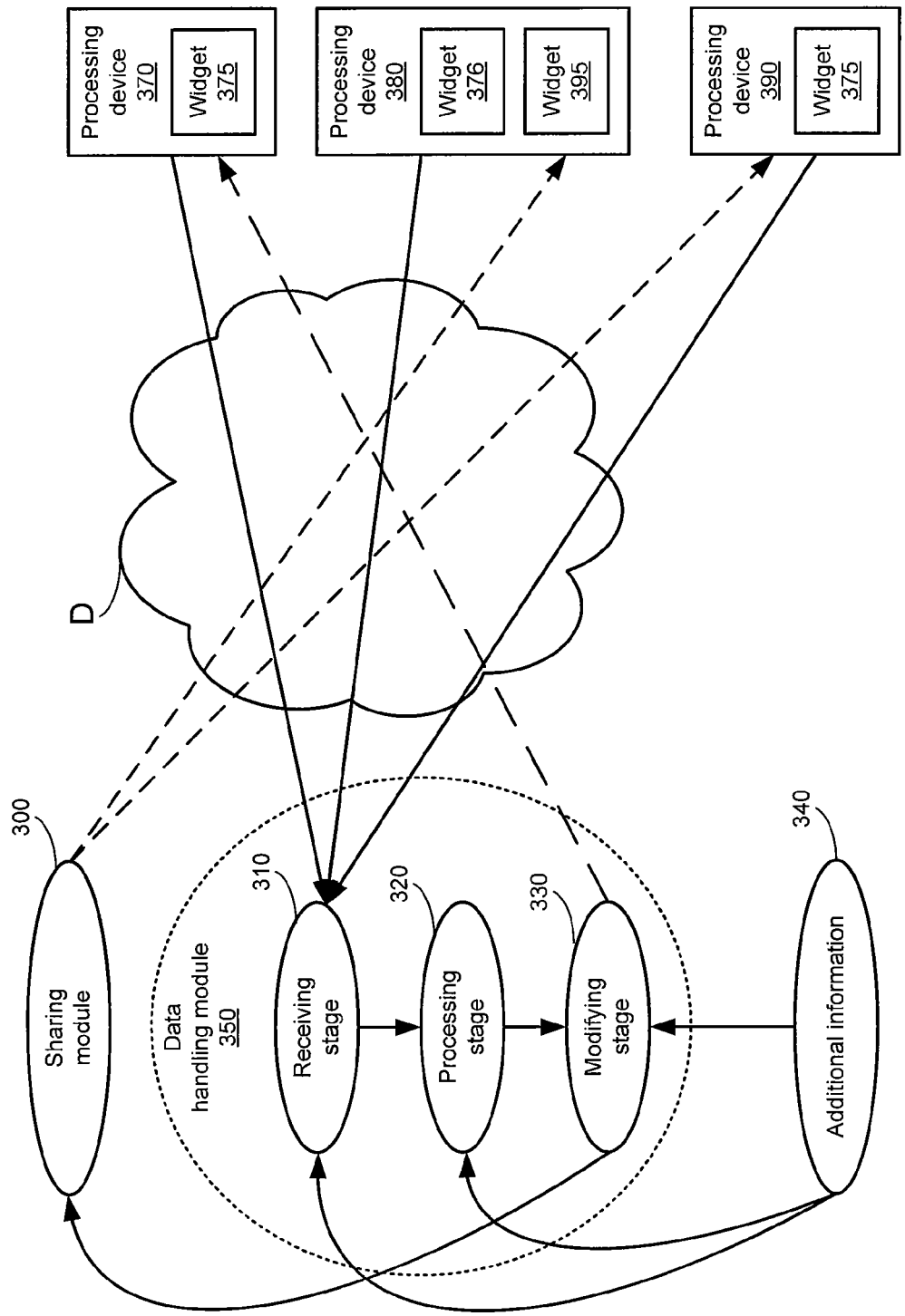

FIG. 3C depicts the modifying stage 330 updating a behavior associated with the current instance of widget 375 in the processing device 330. The sharing module 300 is shown updating a behavior associated with a shared instance of a widget 395 in the processing device 380 and a behavior associated with a shared instance of the widget 375 in the processing device 390. In this example, the data handling module 350 can receive tracking information from the processing devices 370 and 380 (e.g., from widgets 375 and 376, respectively). After receiving the information in the receiving stage 310 and processing (e.g., analyzing) the information in the processing stage 320, the data handling module 350 can be configured to determine whether to modify the behavior associated with currently distributed or subsequently shared instances of widgets (e.g., instances of widgets associated with widget 375 and/or 376, instances of widgets virally spread from widget 375). In this regard, the modification of behavior associated with instances of other widgets can include, but need not be limited to, modifying the content, usage or placement characteristics, operation of associated widget containers or kernels, and/or performance optimization.

In this example, after processing of received tracking information, the modifying stage 330 can update a behavior associated with the current instance of the widget 375 in the processing device 330. The behavior associated with the current instance of the widget 375 can be modified at the request of the instance of the widget or dynamically after the instance of the widget is loaded. The sharing module 300 can be configured to trigger sharing of an instance of a widget 395 to the processing device 380 and an instance of the widget 375 with the processing device 390. The behavior associated with shared instances of widgets 395 and 375 can be modified at various times. For example, the behavior associated with the shared instances of widgets 395 and 275 can be modified before the instance of the widget is loaded, at the time the instance of the widget is loaded, when the instance of the widget is rendered, at the request of the instance of the widget, or dynamically after the instance of the widget is loaded. Moreover, once distributed, the shared instances of widgets 395 and 375 can communicate tracking information to the receiving stage 310 of the data handling module 350.

Figure 3D:
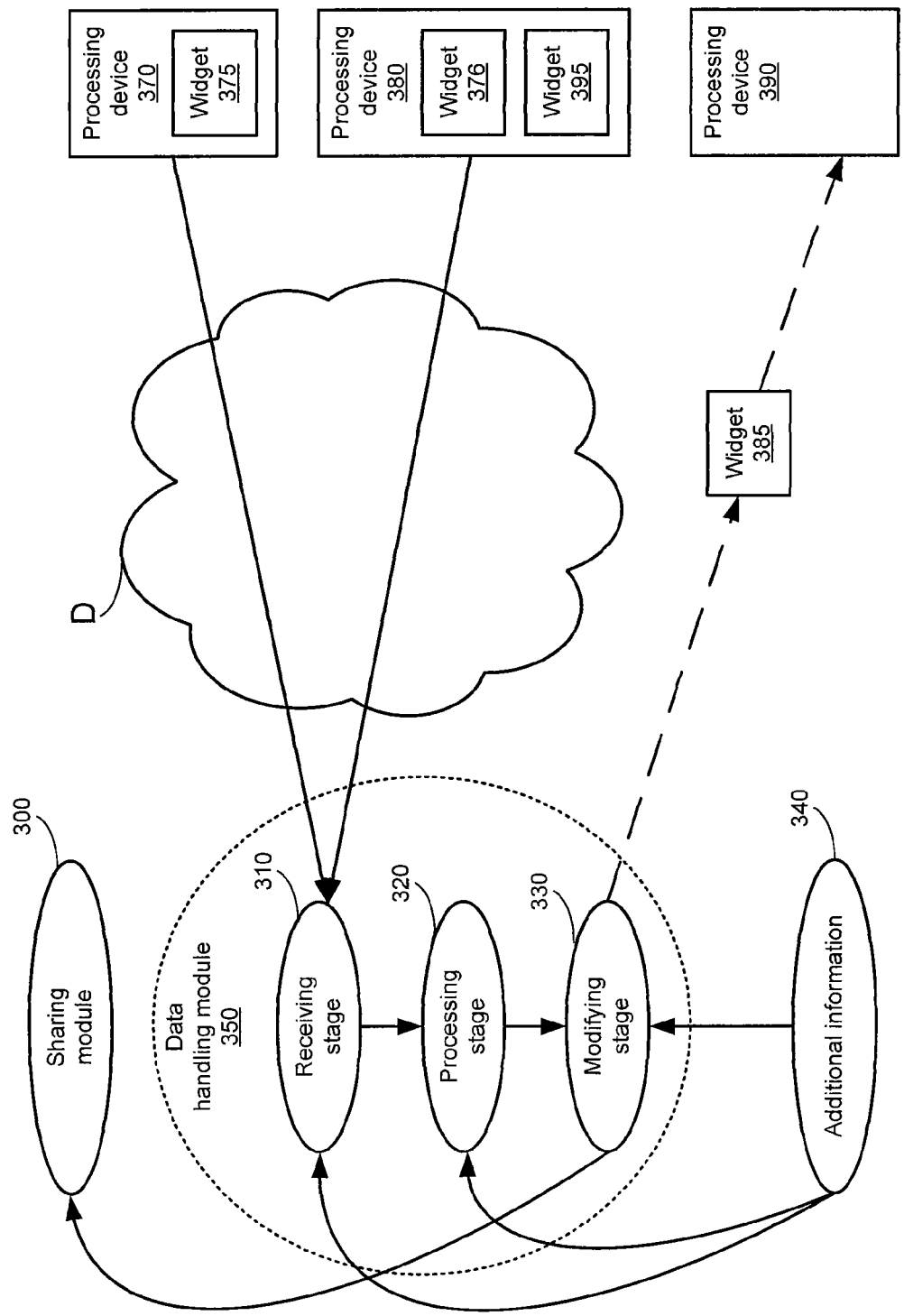

FIG. 3D depicts the modifying stage 330 triggering execution of widget 385 at processing device 390. Rather than modifying widget 375 as was discussed in the prior examples associated with FIG. 3, widget 385 is being sent to processing device 390 for execution. The sending of a particular type of widget (such as widget 385) rather than a different widget (such as widget 375) based on tracking data is a type of behavior modification that can be determined by the data handling module 350. As shown in FIG. 3D, tracking information (e.g., tracking information associated with widgets 375, 376, and 395) received at data handling module 350 from the processing devices 370 and 380 can be used to determine that widget 385 rather than, for example, widget 375 should be delivered to processing device 390 for execution. In some embodiments, processing device 390 or a content aggregation point executing at processing device 390 may have a space reserved for execution of a widget that is exclusively determined dynamically by the data handling module 350.

The tracking information used to determine whether a particular widget should be sent to a processing device 390 for execution can vary. For example, in some embodiments, tracking information associated with a specific user (e.g., related to a particular user-profile) can be used to determine that a specific widget (e.g., a specific advertisement-related widget) should be delivered to a content aggregation point accessed by the specific user. The tracking information associated with the specific user can be associated with multiple instances of widgets that may be related to the content aggregation point and/or different content aggregation points. In other words, the tracking information can be collected from instances of widgets virally spread from various other content aggregation points unrelated to the content aggregation point currently being accessed by the specific user. The determination (e.g., recommendation) that the specific widget should be delivered to a content aggregation point can be performed (e.g., using the stages in the data handling module 350) in response to an indicator that the specific user has accessed the content aggregation point. The specific widget can be delivered to a location on the content aggregation point reserved for execution (e.g., display) of the widget. In some embodiments, the specific widget can be delivered to the location on the content aggregation point in lieu of a default widget.

Although not shown in FIG. 3D, in some embodiments, an indicator or a signal sent from the modifying stage 330 can be sent to a widget server (not shown) to trigger sending of widget 385 rather than another widget (such as widget 375 or a default widget). In some embodiments, the widget server can be configured with intelligence to serve a particular widget (such as widget 385 rather than 375) based on the indicator or signal defined by the modifying stage 330. The particular widget can be selected based on the tracking information as it is processed by the data handling module 350.

While the examples described in FIGS. 3A-3D describe collecting and processing tracking information from instances of a few types of widgets to modify the behavior associated with currently distributed and/or subsequently shared instances of widgets, it is understood that the operation(s) described can also apply to receiving and/or processing tracking information from multiple instances of multiple types of widgets and modifying the behavior associated with currently distributed and/or subsequently shared instances of multiple types of widgets. In this regard, the historical trends, projections, correlations, and/or statistical calculations determined at the processing stage 320 can be related to instances of more than one type of widget.

For example, tracking information associated with a first widget at a first processing device and a second widget at a second processing device can be used to modify a behavior of a third widget at a third processing device. In some embodiments, the first widget and the second widget can be different instances of the same widget virally spread from a widget at a content aggregation point. In some embodiments, the first and second widget can be different widgets of, for example, the same type (e.g., both car advertisements). In some embodiments, the third widget can be a widget virally spread from the first widget or the second widget. In some embodiments, the third widget can be a widget of the same type as the first widget and/or the second widget (e.g., all sports-related widgets). In some embodiments, the third widget may have been sent to its respective processing device before the first widget and/or the second widget have been created and/or executed (e.g., rendered, displayed).

Figure 4A:
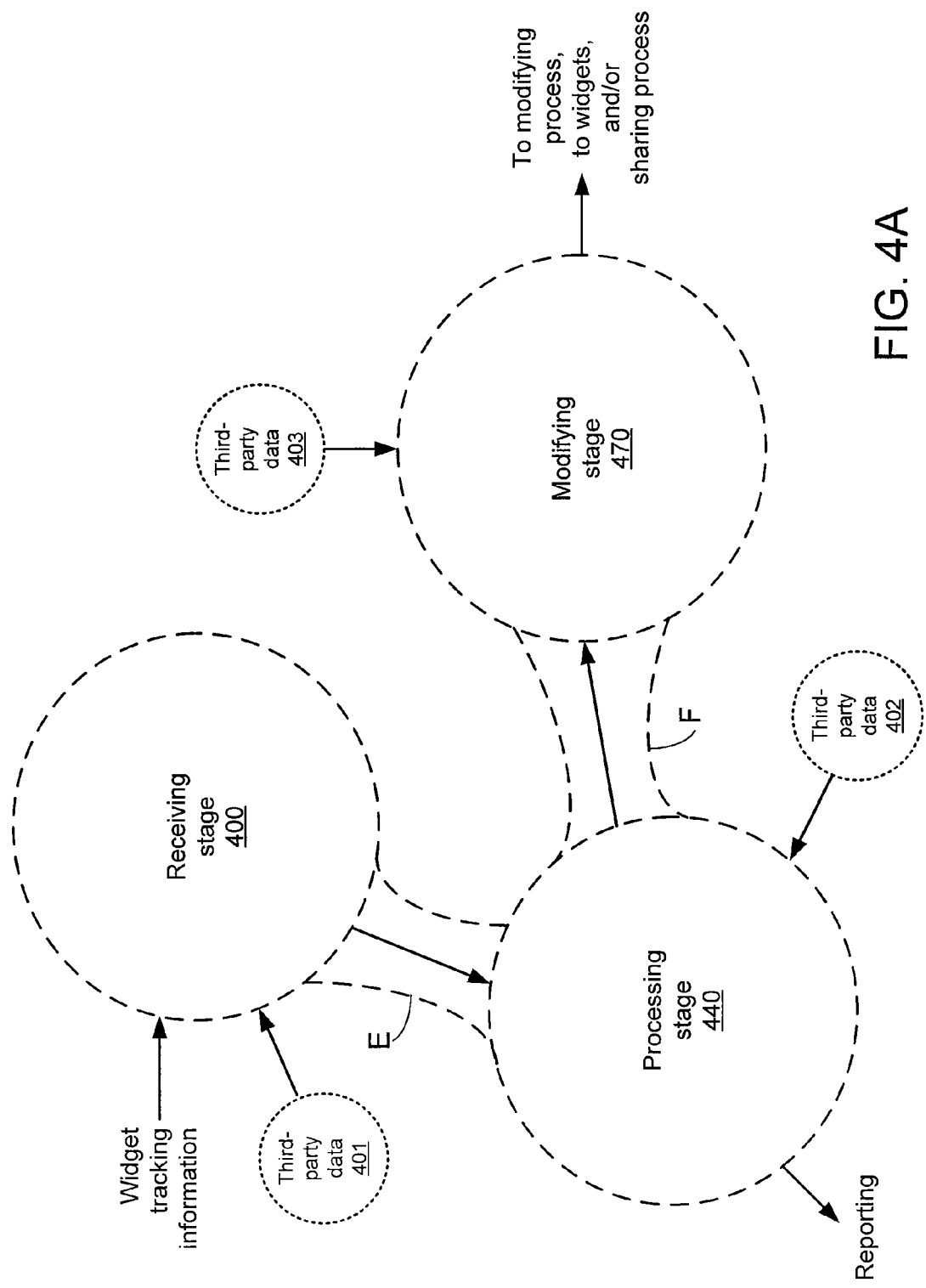
FIGS. 4A-4B are schematic diagrams illustrating a data handling module having a receiving stage, a processing stage, and a modifying stage.
Figure 4B:
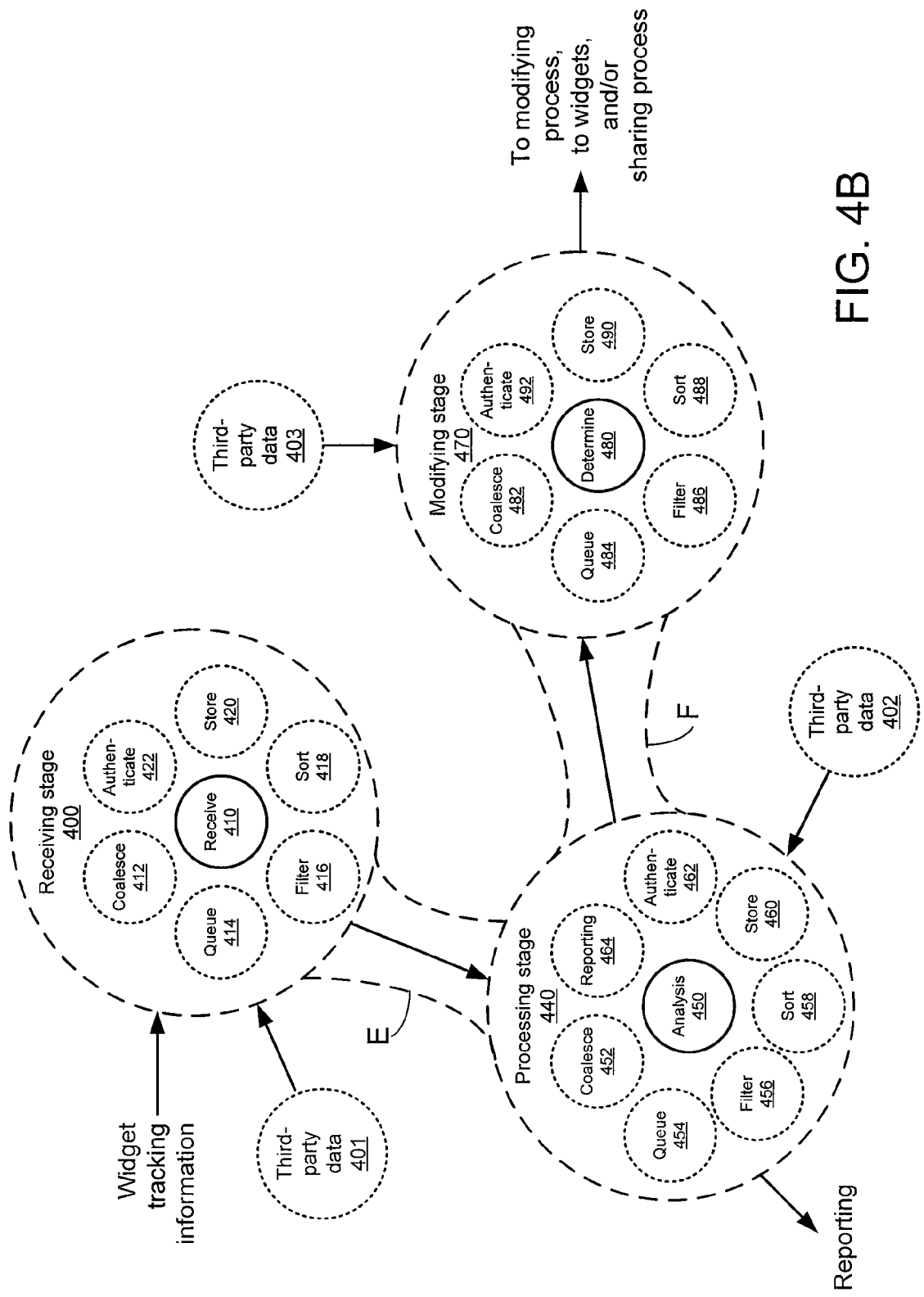

FIGS. 4A-4B are schematic diagrams illustrating a data handling module having a receiving stage, a processing stage, and a modifying stage. FIG. 4A shows the data handling module stages including a receiving stage 400, a processing stage 440, and a modifying stage 470. The receiving stage 400, the processing stage 440, and the modifying stage 470 can each include one or more software-based modules (e.g., set of instructions executable at a processor, software code) to perform the processes associated with each stage.

The receiving stage 400 can be configured to receive tracking information from multiple instances of widgets, such as those described in connection with FIGS. 3A-3D. The receiving stage 400 can also receive third-party data 401 from, for example, the additional information 340 described in connection with FIGS. 3A-3D. The third-party data 401 can include, for example, information used for fraud detection, source or information validation, and/or for spamming (e.g., indiscriminately sent unsolicited bulk messages) protection. The processing stage 440 can be configured to receive the output of the receiving stage 400 and/or third-party data 402. The third-party data 402 can include, for example, demographic and/or behavioral information (e.g., rendering time information, user-triggered interactions with a widget). Similarly, the modifying stage 470 can be configured to receive a portion of the output of the processing stage 440 and/or third party data 403. The third-party data 403 can include, for example, advertisement information for targeted optimization. The output of the modifying stage 470 can be communicated to a sharing module (e.g., a sharing server), a modifying process (e.g., a third-party modifying server), or to instances of widgets. In some instances, a portion of the output of the processing stage 440 can be used to, for example, generate a report.

Also shown in FIG. 4A is a connecting section E between the receiving stage 400 and the processing stage 440 and a connecting section F between the processing stage 440 and the modifying stage 470. These sections are illustrative of how, in some embodiments, at least a portion of the processes or operations that may be associated with one stage can be performed by another stage. For example, in some implementations it may be desirable to perform an operation at the processing stage 440 rather than at the receiving stage 400. Similarly, in some implementations, it may be desirable to perform a process at the processing state 440 rather than at the modifying stage 470. In other embodiments, however, each stage is a distinct and separate stage and the output of one distinct stage is an input to the next distinct stage. In other words, the stages can be implemented as a processing pipelining.

FIG. 4B illustrates various processes that can occur (e.g., operations that can be performed) within each of the stages in the data handling module. The receiving stage 400 can include, but need not be limited to, a receive process 410, a coalesce process 412, a queue process 414, a filter process 416, a sort process 418, a store process 420, and an authenticate process 422. Each of the processes at the receiving stage 400 can correspond to, for example, a software-based and/or hardware-based module.

The processing stage 440 can include, but need not be limited to, an analysis process 450, a coalesce process 452, a queue process 454, a filter process 456, a sort process 458, a store process 460, an authenticate process 462, and a reporting process 464. Each of the processes in the processing stage 440 can correspond to, for example, a software-based and/or hardware-based module.

The modifying stage 470 can include, but need not be limited to, a determine process 480, a coalesce process 482, a queue process 484, a filter process 486, a sort process 488, a store process 490, and an authenticate process 492. Each of the processes in the modifying stage 470 can correspond to, for example, a software-based and/or hardware-based module. In some embodiments, one or more of the processes of the receiving stage 400, the processing stage 440, and the modifying stage 470 can be performed by a one or more software-based and/or hardware-based modules.

The processes in each of the receiving stage 400, the processing stage 440, and the modifying stage 470 can operate on information based on, for example, one or more identifiers. For example, widget identifiers, user identifiers, placement identifiers, content identifiers, session identifiers, processor identifiers, and/or content aggregation point identifiers, can be used to perform the processes in the various stages of the data handling module.

At the receiving stage 400, the authenticate process 422 can be configured to validate a session associated with an instance of a widget. The receive process 410 can be configured to receive tracking information from multiple instances of widgets. The receive process 410 can receive, for example, packets that can contain a header (e.g., routing information) and a payload (e.g., tracking information). The receive process 410 can be configured to remove the header and pre-process the tracking information in the payload of the packet. The coalesce process 412 can be configured to collect and/or combine tracking information associated with a session of an instance of a widget. In this regard, tracking information obtained from received packets and associated with one or more identifiers related to the instance of a widget can be coalesced into a single packet, for example. The single coalesced packet can be completed and can be ready for further processing after the session associated with the instance of the widget terminates.

The queue process 414 can be configured to queue received tracking information (e.g., packets) in a manner that results in an effective processing of the received information. The filtering process 416 can be configured to filter, augment, or remove specified received information. For example, the filtering process 416 can be used to allow valid information to proceed for further processing. The filtering process 416 can remove from further processing any received information that is not from a valid source, information that itself is not valid (e.g., fraudulent information), or information that is received from an invalid session, for example. In this regard, the filtering process 416 can use information received from, for example, the third-party data 401. In some embodiments, the filter process 416 can augment, for example, tracking information. For example, tracking information received at the filter process 416 can be augmented by combining several categories of the tracking information into new tracking information.

The sort process 418 can be configured to sort received information according to one or more identifiers. For example, the sort process 418 can be used to map the tracking information associated with an instance of a widget to a computing entity (e.g., a server). In some embodiments, the tracking information can be sent to the computing entity based on the mapping. The sorting can be based on a widget identifier (e.g., server X processes information associated with widget Y), but can also be based on other identifiers such as, for example, content identifiers (e.g., server X processes information associated with video content). The store process 420 can be configured to store tracking information before any pre-processing, during pre-processing, and/or after pre-processing. In some embodiments, the store process 420 can be configured to store tracking information in any of multiple types of data structures.

The coalesce processes 452 and 482 can be substantially similar in operation to the coalesce process 412 but are configured to operate at the processing stage 440 and the modifying stage 470, respectively. Similarly, other processes at the processing stage 440 and the modifying stage 470, such as the queue processes 454 and 484, the filter processes 456 and 486, the sort processes 458 and 488, the store processes 460 and 490, and the authenticate processes 462 and 492 can be substantially similar in operation to their corresponding processes in the receiving stage 400.

In the processing stage 440, the analysis process 450 can be configured to determine historical trends, projections, correlations, and/or statistical calculations related to instances of widgets by processing (e.g., using statistical algorithms) the tracked information received. The reporting process 464 can be configured to collect at least a portion of the processed information, including some of the determined trends, projections, and/or correlations, for example, and present them in an organized manner. In this regard, multiple reports can be generated from the same processed information based on the reporting parameters being considered. The reporting parameters can include, for example, time parameters, user profile parameters, widget-related parameters (e.g., widget identifier, widget type indicator), destination parameters (e.g., destination address), and so forth.

At the modifying stage 470, the determine process 480 can be configured to further process the results or output produced by the processing stage 440. The determine process 480 can be configured to determine or establish whether a behavior(s) associated with currently distributed and/or subsequently shared instances of a widget(s) is to be modified and/or the manner by which the modification is to occur. In some embodiments, the determine process 480 can be configured to modify or update a behavior associated with an instance of a widget, can communicate with a sharing module (e.g., a sharing server) configured to modify or update instances of widgets, and/or can communicate with a separate and distinct modification process or operation (e.g., a separate server) configured to modify instances of widgets.

FIGS. 5A-5D are schematic diagrams illustrating hierarchical data structures for storing information processed by the data handling module. The storing processes 420, 460, and 490 described in FIG. 4B can use hierarchical data structures for storing information in an efficient manner. A hierarchical data structure is a structure of data organized in multiple levels, such as, for example, in a tree-like structured. Each level in the organized structure can correspond to, for example, a different level of resolution of the data contained within the data structure. In this manner, the hierarchical data structure can be used to improve the efficiency and/or speed of analysis algorithms. For example, processing time can be improved by utilizing algorithms that access data or information at a specified level of resolution only when the data or information is necessary in the algorithmic operation. Each level in the organized structure can include multiple "buckets" to store information.

Figure 5A:
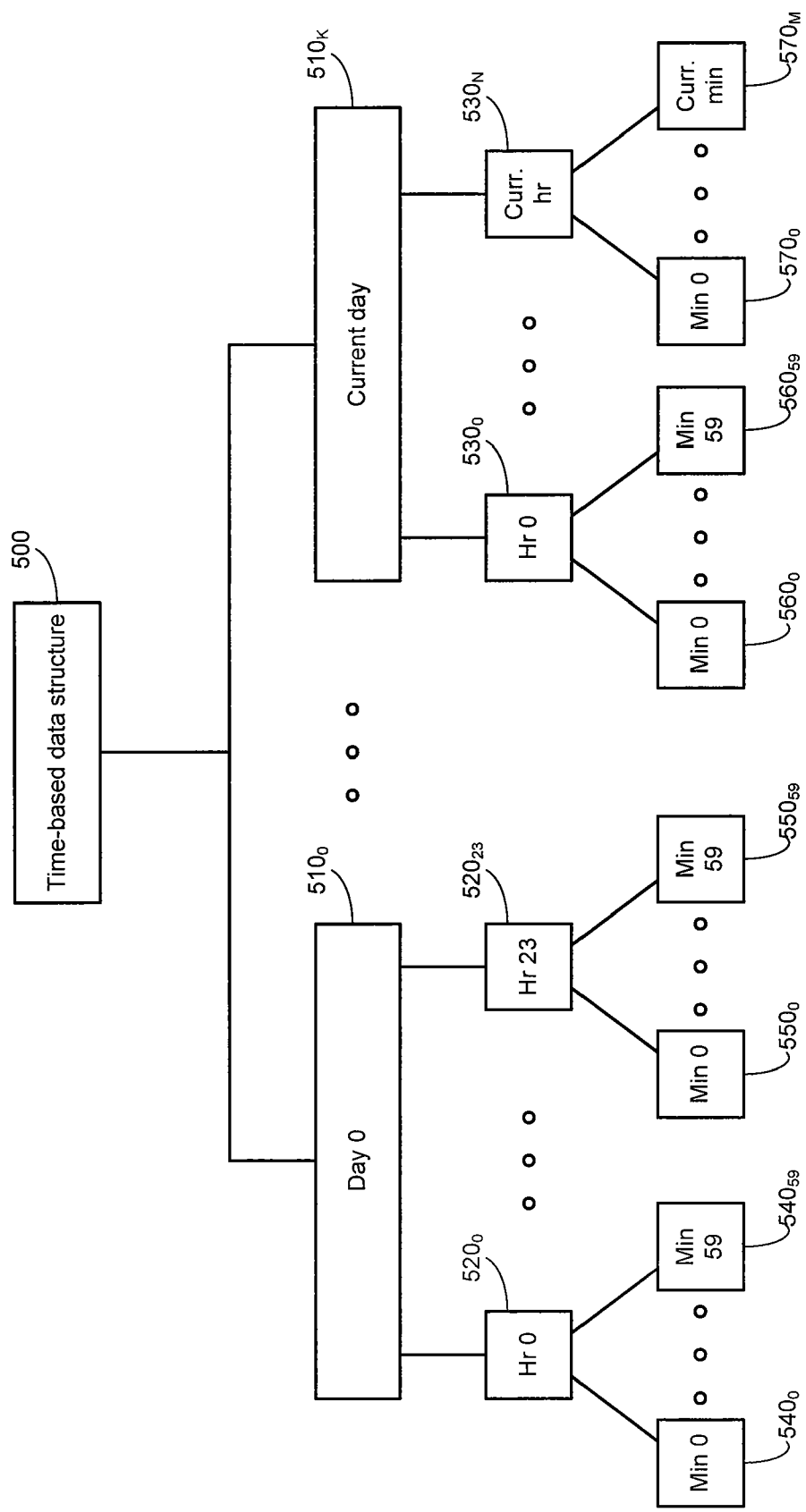
FIGS. 5A-5D are schematic diagrams illustrating hierarchical data structures for storing information processed by the data handling module.

FIG. 5A illustrates a time-based data structure 500 that can include time information (e.g., activity date and timing) associated with multiple instances of multiple widgets, for example. In this example, the time-based data structure 500 has a next level of resolution that can include information associated with days $510_0, \ldots, 510_K$, where day $510_0$ can correspond to a first day of collecting information and day $510_K$ can correspond to a current day of collecting information. A next level of resolution can include information associated with hours (Hr) $520_0, \ldots, 520_{23}$ corresponding to the 24 hours in day $510_0$ and hours $530_0, \ldots, 530_N$ corresponding to a current number of hours in day $510_K$. A further level of resolution can include information associated with minutes (Min) $540_0, \ldots, 540_{59}$ corresponding to the 60 minutes in hour $520_0$, minutes $550_0, \ldots, 550_{59}$ corresponding to the 60 minutes in hour $520_{23}$, minutes $550_0, \ldots, 550_{59}$ corresponding to the 60 minutes in hour $530_0$, and minutes $570_0, \ldots, 570_M$ corresponding to the current minutes in hour $530_N$.

Figure 5B:
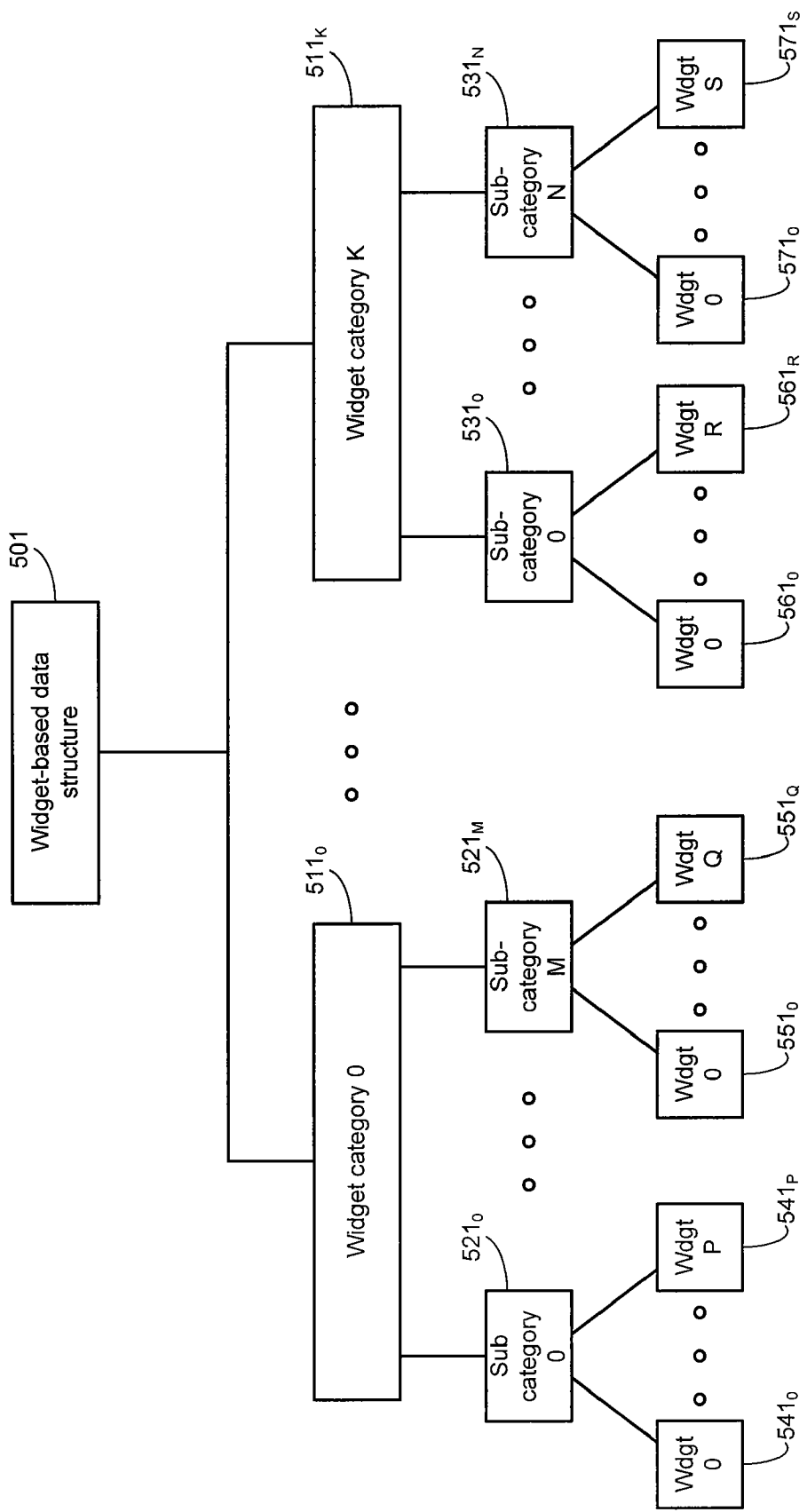

In another example, FIG. 5B illustrates a widget-based data structure 501 that can include widget information (e.g., widget type (video, image) or categories (sports-related, music-related)) associated with multiple instances of multiple widgets, for example. In this example, the widget-based data structure 501 has a next level of resolution that can include information associated with widget categories $511_0, \ldots, 511_K$, where category $511_0$ can correspond to a widget category 0 and category $511_K$ can correspond to a widget category K. A next level of resolution can include information associated with sub-categories $521_0, \ldots, 521_M$ corresponding to category $511_0$ and sub-categories $531_0, \ldots, 531_N$ corresponding to category $511_K$. A further level of resolution can include information associated with widgets (Wdgt) $541_0, \ldots, 541_P$ corresponding to sub-category $521_0$, widgets $551_0, \ldots, 551_Q$ corresponding to sub-category $521_M$, widgets $561_0, \ldots, 561_R$ corresponding to sub-category $531_0$, and widgets $571_0, \ldots, 571_S$ corresponding to sub-category $531_N$.

Figure 5C:
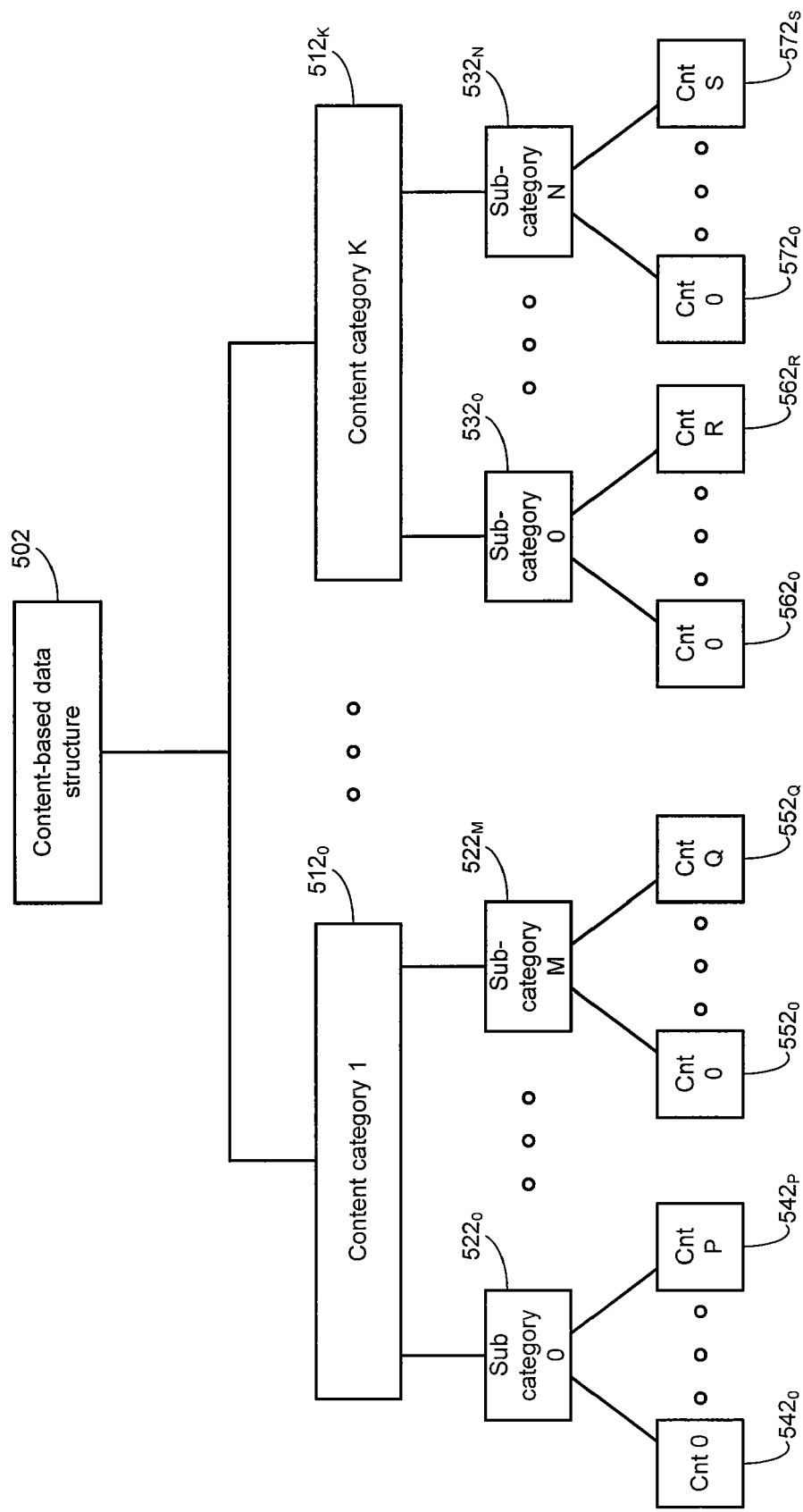

In another example, FIG. 5C illustrates a content-based data structure 502 that can include content information (e.g., content type or categories) associated with multiple instances of multiple widgets, for example. In this example, the content-based data structure 502 has a next level of resolution that can include information associated with content categories $512_0, \ldots, 512_K$, where category $512_0$ can correspond to a content category 0 and category $512_K$ can correspond to a content category K. A next level of resolution can include information associated with sub-categories $522_0, \ldots, 522_M$ corresponding to category $512_0$ and sub-categories $532_0, \ldots, 532_N$ corresponding to category $512_K$. A further level of resolution can include information associated with individual content (Cnt) $542_0, \ldots, 542_P$ corresponding to sub-category $522_0$, content $552_0, \ldots, 552_Q$ corresponding to sub-category $522_M$, content $562_0, \ldots, 562_R$ corresponding to sub-category $532_0$, and content $572_0, \ldots, 572_S$ corresponding to sub-category $532_N$.

Figure 5D:
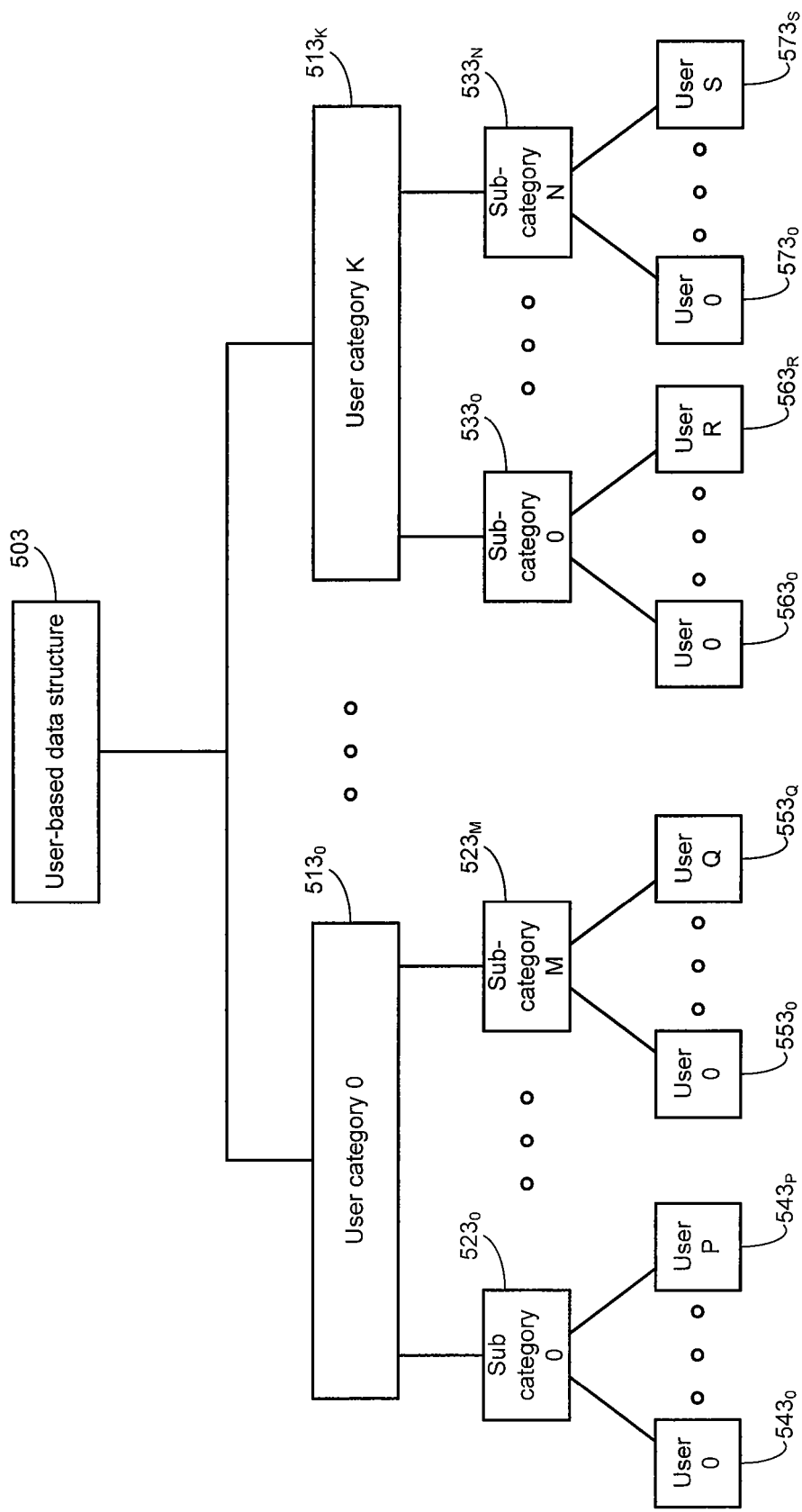

In another example, FIG. 5D illustrates a user-based data structure 503 that can include user information (e.g., user name, user preferences, sex of the user, age of the user, location of the user) associated with multiple instances of multiple widgets, for example. In this example, the user-based data structure 503 has a next level of resolution that can include information associated with user categories $513_0, \ldots, 513_K$, where category $513_0$ can correspond to a user category 0 and category $513_K$ can correspond to a user category K. A next level of resolution can include information associated with sub-categories $523_0, \ldots, 523_M$ corresponding to category $513_0$ and sub-categories $533_0, \ldots, 533_N$ corresponding to category $513_K$. A further level of resolution can include information associated with individual users $543_0, \ldots, 543_P$ corresponding to sub-category $523_0$, users $553_0, \ldots, 553_Q$ corresponding to sub-category $523_M$, users $563_0, \ldots, 563_R$ corresponding to sub-category $533_0$, and users $573_0, \ldots, 573_S$ corresponding to sub-category $533_N$.

Other hierarchical data structures can also be implemented for efficient handling of tracking information. Such additional hierarchical data structures can include session-based data structures, placement-based data structures, and/or content-aggregation-point-based data structures, for example. The hierarchical data structures can be combined and/or divided to create different hierarchical data structure categories that can be used to process (e.g., parse) tracking information. For example, the user-based data structure 503 shown in FIG. 5D can be used in conjunction with the content-based data structure 502 shown in FIG. 5C to process incoming tracking information.

Figure 6:
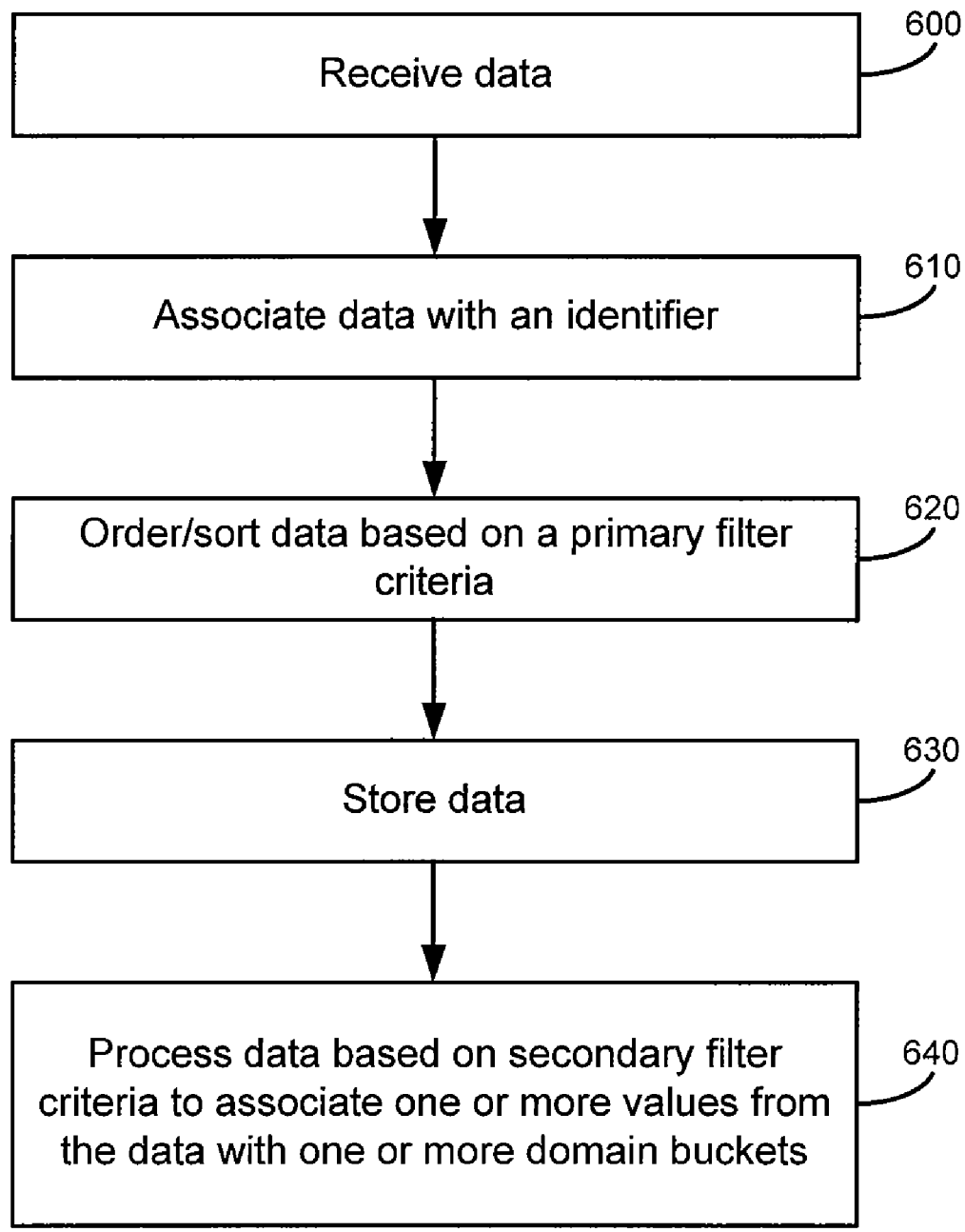
FIG. 6 is a flow chart that illustrates a method for handling information associated with multiple instances of widgets.

FIG. 6 is a flow chart that illustrates a method for handling information associated with multiple instances of widgets. At 600, data related to instances of widgets are received at, for example, the receiving stage 310 of the data handling module 350 as shown in FIGS. 3A-3D. At 610, the data or information received can be associated with one or more identifiers. At 620, the data can be sorted or ordered based on a primary filter criteria such as a first identifier, for example. The first identifier can include one or more widget identifiers, session identifiers, user identifiers, content identifiers, placement identifiers, processor identifiers, and/or content-aggregation-point identifiers. The sorting or ordering at 620 can be associated with, for example, the processing stage 320 of the data handling module 350.

At 630, the sorted data can be stored in one or many data structures, such as the hierarchical data structures described in FIGS. 5A-5D, for example. At 640, the stored data can be processed based on a secondary filter criteria such as a second identifier, for example. The second identifier can include one or more widget identifiers, session identifiers, user identifiers, content identifiers, placement identifiers, processor identifiers, and/or content-aggregation-point identifiers. The processing in 640 can be used to associate the processed data with one or more folder-like "buckets" to store the data in an effective manner.

Figure 7:
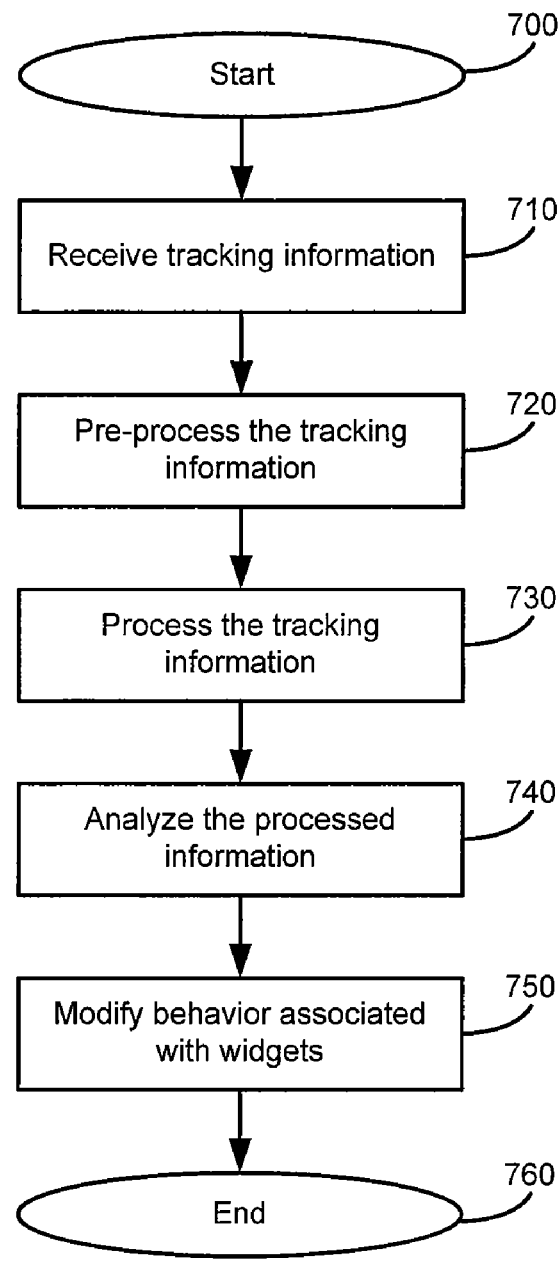
FIG. 7 is a flow chart that illustrates another method for handling information associated with multiple instances of widgets.

FIG. 7 is a flow chart that illustrates another method for handling information associated with multiple instances of widgets. At 710, after start 700, tracking information can be received by the receiving stage 400 of a data handling module, as shown in FIG. 4B. At 720, the tracking information received can be pre-processed by, for example, the receiving stage 400. The pre-processing can include operations related to, for example, the receive process 410, the coalesce process 412, the queue process 414, the filter process 416, the sort process 418, the store process 420, and/or the authenticate process 422. The receiving stage 400 can be configured to use third-party data in its pre-processing operations.

At 730, the pre-processed tracking information can be further processed by, for example, the processing stage 440 described in FIG. 4B. The processing at 730 can include operations related to the coalesce process 452, the queue process 454, the filter process 456, the sort process 458, the store process 460, and/or the authenticate process 462. In some instances, the processing at 730 can include operations related to the reporting process 464. The processing stage 440 can be configured to use third-party data in its operations.

At 740, the processed tracking information can be analyzed by, for example, the analysis process 450 in the processing stage 440. The analysis process 450 can include determining, for example, historical trends, projections, correlations, and/or statistical calculations related to the instances of widgets being tracked.

At 750, before end at 760, the analyzed information can be used by, for example, the modify process 480 in the modifying stage 470, to determine whether to modify the behavior associated with instances of widgets and/or modify the behaviors associated with instances of widgets. The modification can include determining changes to the behavior associated with instances of widgets and/or their associated widget containers or kernels. The modifying stage 470 can be configured to use third-party data in its determinations. Moreover, the determinations that result at 750 can be communicated to a sharing module (e.g., a sharing server) configured to modify the behavior associated with shared instances of widgets and/or their corresponding widget containers or kernels.

FIGS. 8 and 9 illustrate mechanisms (methods and apparatus) for sharing widgets from which tracking information can be collected. FIG. 8 is a schematic block diagram that illustrates a widget-sharing host 800 configured to control sharing of a widget 826 between content aggregation points 842, 852, and/or 862. The content aggregation points 842, 852, and 862 are associated, respectively, with network entities 840, 850, and 860 within a network 870. The network 870 can be any type of network such as a LAN and/or a WAN implemented as a wired network and/or a wireless network (e.g., cellular/mobile network, wi-fi, wireless LAN) in a variety of environments such as, for example, an office complex. In this embodiment, network entities 840 and 850 are wired network entities (e.g., computer, server) and network entity 860 is a wireless network entity (e.g., a mobile phone, a PDA) configured to communicate with the network 870 via wireless gateway 875.

The widget-sharing host 800 is configured to send and/or receive signals (e.g., instructions, data) to facilitate sharing of the widget 826. In this embodiment, the widget-sharing host 800 is configured facilitate sharing of widget 826 (e.g., instance of widget 826) from content aggregation point 842 of network entity 840 to content aggregation point 852 of network entity 850, and from content aggregation point 852 of network entity 850 to content aggregation point 862 of network entity 860, in that order.

Instances of the widget 826 are served to each of the content aggregation points 842, 852, and 862 from a widget server 810 separate from the widget-sharing host 800. Because sharing of the widget 826 is triggered through the widget-sharing host 800, the widget 826 (e.g., instances of the widget 826) can be shared without direct communication between the network entities 840, 850, and/or 860 (and/or content aggregation points 842, 852, and/or 862). Signals related to sharing of the widget 826 from content aggregation point 842 to content aggregation point 852, and from content aggregation point 852 to content aggregation point 862 are shown, in order, as lines 1 through 9.

As shown in FIG. 8, at least a portion of an instance of the widget 826 is sent from the widget server 810 to the network entity 840 (line 1) for execution within the content aggregation point 842. After at least a portion of an instance of the widget 826 is received at the content aggregation point 842 of network entity 840, sharing of the widget 826 from the content aggregation point 842 to the content aggregation point 852 is triggered by a sharing signal defined at and sent from network entity 840 to the widget-sharing host 800 (line 2). The sharing signal can be defined at a sharing service module associated with network entity 840 and/or associated with widget 826.

In some embodiments, a portion of the widget 826 can be executed (e.g., displayed) at the content aggregation point 842 of network entity 840 before the sharing signal (line 2) is sent from the network entity 840. In some embodiments, a sharing signal can be sent before the widget 826 is received (e.g., after widget precursor received). In some embodiments, the sharing signal can originate at the network entity 840 (e.g., at content aggregation point 842 of network entity 840) and/or can be triggered by the network entity 840 any time before, after, or during execution of widget 826.

In response to the sharing signal (line 2), the widget-sharing host 800 is configured to send a widget precursor (line 3) to the content aggregation point 852 of network entity 850. The widget precursor can include one or more references that can be accessed at network entity 850 and/or used by network entity 850 to request an instance of the widget 826 from widget server 810 (line 4). An instance of the widget 826 can be sent to the content aggregation point 852 of network entity 850 from the widget server 810 (line 5) in response to the request (line 4).

In some embodiments, the widget precursor can include an instruction and/or can be a message including one or more references (e.g., a widget reference, a widget-container reference). In some embodiments, a widget precursor can include a reference to another widget precursor. In some embodiments, the widget precursor can be a widget container that includes a reference to the widget 826 or a webpage (or other type of vehicle) that includes a reference to the widget 826. The widget 826 can be "contained" in a widget container when a widget and/or service module is either referenced in the widget container or integrated into the procedural software framework of the widget container. When being contained in the widget container, the widget 826 can be referred to as being wrapped or containerized in the widget container. As a procedural software framework, the widget container can be a series of instructions that are executable or interpretable by, for example, a computer processor. In some embodiments, the widget 826 can be executed within the widget container after the widget container is received at and executed within, for example, content aggregation point 852. More details related to widget-container hosting and generation are set forth in co-pending application Ser. No. 11/537,362, "Method and Apparatus for Widget-Container Hosting and Generation," which is incorporated herein by reference in its entirety.

In some embodiments, a widget identifier, a capability indicator, and/or a user preference that can be used by the widget-sharing host 800 to define the widget precursor (line 3). In other words, the widget precursor can be dynamically defined based on the widget identifier, the capability indicator, and/or the user preference. For example, a widget identifier and/or user preference associated with widget 826 and included in the sharing signal (line 2) can be used by the widget-sharing host 800 to define the widget precursor (line 3). The widget identifier and/or user preference associated with widget 826 can be used to define a reference and/or instruction in the widget precursor (line 3) sent to the network entity 850 so that network entity 850 can request an instance of widget 826 having a particular configuration. In some embodiments, a capability indicator and/or user preference received at the widget-sharing host 800 from network entity 850 (the destination network entity) can be used to define the widget precursor (line 3).

In some embodiments, a placement identifier can be defined at the widget-sharing host and associated with an instance of the widget 826 being placed at the content aggregation point 852 of network entity 850. The widget 826 is placed at the content aggregation point 852 when a reference to the widget 826 (or a reference to a widget container that contains the widget) is, for example, associated with the content aggregation point 852. In some embodiments, the placement identifier can be defined in response to the sharing signal (line 2). In some embodiments, when the instance of the widget 826 is, for example, executed within the content aggregation point 852 and/or otherwise associated with the content aggregation point 852, a placement identifier can be defined and stored at the widget-container host 800. In some embodiments, the placement identifier can be stored at the network entity 850.

The placement identifier included in the sharing signal can be used to create parentage associated with the widget 826. For example, part of the parentage of widget 826 can be defined by associating the placement identifier associated with placement of the widget 826 at the content aggregation point 842 of network entity 840 with a placement identifier of a placement of the widget 826 at the content aggregation point 852 of network entity 850. In other words, the placement identifier can be used to determine parentage of the widget 826 as it is shared between the network entities. More details related to placement identifiers and widget parentage are set forth in co-pending application Ser. No. 11/537,375, "Method and Apparatus for Widget Container/Widget Tracking and Metadata Manipulation," which is incorporated herein by reference in its entirety.

After at least a portion of an instance of the widget 826 is received at the content aggregation point 852 of network entity 850 (line 5), sharing of an instance of the widget 826 with the content aggregation point 862 of network entity 860 can be triggered at network entity 850 and performed using the same method described above. In other words, the widget 826 can be subsequently shared after at least a portion of the widget 826 has been received at the network entity 850. A sharing signal (line 6) can be defined at network entity 850 and sent to the widget-sharing host 800. In response to the sharing signal (line 6), the widget-sharing host 800 can send a widget precursor (line 7) to the content aggregation point 862 of network entity 860. The information and/or instructions included in the widget precursor (line 7) can be used to request (line 8) an instance of widget 826. In response to the request, widget server 810 can send the instance of widget 826 for execution within the content aggregation point 862 of network entity 860.

In some embodiments, a widget container that is served as a widget precursor can contain one or more service modules. For example, a widget container that is served to, for example, network entity 850 as a widget precursor (line 3) that includes a reference to widget 826 can contain one or more service modules. In some embodiments, the service module included in the widget container can be a pre-defined function. For example, the service module can be a metadata searching/retrieval module, a polling/categorizing module, a widget container deployment module (e.g., using a placement service module), a transaction service module (e.g., service module for facilitating a web purchase, service module used for signing a user up for a web service, etc.), a security module (e.g., security firewall module), and/or a widget container tracking module. The service module can also be a referral service module (e.g., a service used to refer a viewer to a widget container), an advertisement service module (e.g., a service module that includes an advertisement), or a directory service module (e.g., a service module used for searching in a directory).

After the widget 826 has been placed at (e.g., linked at) a content aggregation point, such as content aggregation point 842, the widget 826 can be executed at the content aggregation point 842 when requested. For example, in response to an instruction included in a widget precursor, such as the widget precursor shown at line 7, a reference to the widget 826 can be included in the content aggregation point 826 and configured so that the widget is requested when the reference is accessed. In some embodiments, the widget-container is a portable framework that can be referenced in (e.g., embedded in, referenced using an embed or object tag) and/or accessed from/using a content aggregation point (e.g., web-page, mobile content vehicle).

In some embodiments, a reference to widget 826 can be included in a widget container that has been placed at the content aggregation point (e.g., a reference to the widget container included at the content aggregation point). The widget container can include one or more service modules including, for example, a sharing service module that can be used to share the widget 826. In some embodiments, the widget container and widget 826 can be served from separate entities. For example, the widget container can be served from widget-sharing host 800 when requested at, for example, network entity 850, and widget 826 can be served from the widget server 810 after a reference to the widget 826 has been accessed at the widget container. In some embodiments, the content aggregation point 852, such as a webpage, can be served from yet a different entity. In some embodiments, the widget container can be dynamically served and modified based on metadata associated with the widget 826 and/or widget container. In some embodiments, a widget 826 that is not contained in a widget container can be configured to invoke various functions associated with service modules, such as those listed above, via an API.

In some embodiments the widget-sharing host 800 can be configured to control the sharing (e.g., distribution) of widgets based on a content rules. More details related to the control of widget sharing based on content rules are set forth in co-pending application Ser. No. 11/682,639, "Method and Apparatus for Widget and Widget-Container Distribution Control Based on Content Rules," which is incorporated herein by reference in its entirety.

In some embodiments, the widget-sharing host 800 is not in communication with, for example, network entity 850 during a time period between sending of the widget precursor (line 3) and receipt of the sharing signal (line 6). In some embodiments, during this time period only tracking data associated with the widget 826 is transmitted from the network entity 850. In some embodiments, during this time period only data related to a service module (not shown) associated with the widget 826 is transmitted from the network entity 850. In some embodiments, the functionality of the widget-sharing host 800 can be included in (e.g., distributed within) a set of widget-sharing host 800.

FIG. 9 is a flowchart that illustrates a method for sharing a widget between a source content aggregation point and a destination content aggregation point based on a series of widget precursors. Also, the flowchart illustrates a method for sending a widget precursor based on a capability indicator, a user preference, and/or a widget identifier.

As shown in FIG. 9, at least a portion of an instance of a widget is received at a source content aggregation point of a source network entity at 900. When the portion of the widget instance is received, the portion of the widget instance can be executed at the source content aggregation point. For example, in some embodiments, the portion of the widget instance can be displayed.

After at least a portion of the widget instance has been received at 900, a share module associated with the widget is executed at 910. The share module can be a share module included in a widget container containing the widget. In some embodiments, a function associated with the share module can be invoked via an API associated with the share module. In some embodiments, the share module can be included in a content aggregation point (e.g., webpage) or a mobile content vehicle (e.g., a WAP page).

A widget identifier associated with the widget is obtained and sent to a widget-sharing host in a sharing signal at 920. The widget identifier can be obtained using the share module and sent to the widget-sharing host in a sharing signal defined using the share module. In some embodiments, the widget identifier can be associated with a set of widgets that includes more than one configuration (e.g., formats, protocols) of a single widget. One or more configurations of the single widget from the set of widgets can be associated with a platform of a network entity. For example, a first widget can have a configuration that is compatible with a particular platform of a mobile phone and a second widget can have a configuration that is compatible with a different platform. The first widget and the second widget can be associated with a single widget identifier because the first widget and the second widget have substantially the same content despite having different configurations.

In some embodiments, the sharing signal can be generated by a sharing module associated with the widget. In some embodiments, the sharing module can be referred to as a placement module. For example, the sharing module can be included in (e.g., integrated within) a widget container containing the widget. In some embodiments, the sharing signal can be defined based on a sharing module included in the content aggregation point or trigger via a link included in a content aggregation point.

In some embodiments, the sharing signal can include an indicator of a sharing target such as a particular content aggregation point or destination network entity. In some embodiments, the sharing target can be an address associated with a content aggregation point or an address associated with an entity such as a destination network entity. In some embodiments, the sharing target can be, for example, a telephone number associated with a mobile device, a handle associated with a user of a service, or a username.

A placement identifier for association with a placement of the widget at a destination content aggregation point of a destination network entity is defined at 930. The placement identifier can be defined at the widget-container host and can be, for example, a globally unique identifier. In some embodiments, the placement identifier associated with placement of the widget at the destination content aggregation point can be associated with a placement identifier of placement of the widget at the source content aggregation point to define parentage of the widget. In some embodiments, the placement identifier can be defined at, for example, a share module rather than at the widget-sharing host.

In some embodiments, the sharing signal can include other information in addition to that described above. For example, the sharing signal can include metadata associated with a widget (e.g., user preferences). The metadata can be defined at a source network entity.

A first widget precursor can be defined and sent to the destination network entity at 940. In some embodiments, the first widget precursor can be defined at and sent from the widget-sharing host. In some embodiments, a link associated with the first widget precursor can be aliased at, for example, a domain name service (DNS) server. For example, if the first widget precursor is an SMS message, a link associated with the SMS message can be aliased at, for example, a domain name service (DNS) server. In some embodiments, the widget-sharing host can be configured to trigger a separate network entity to define and send the first widget precursor to the destination network entity. In some embodiments, the proxy device can be configured to modify any portion of the SMS message (e.g., text portion, link within the SMS message).

In some embodiments, the first widget precursor can include the placement identifier and the widget identifier. If the destination network entity is a handheld mobile device, the first widget precursor can be a text-based message such as short message service (SMS) message that includes the placement identifier and the widget identifier. In some embodiments, the widget-sharing host can trigger an SMS proxy device to define and send the SMS message to the destination network entity. In some embodiments, a widget precursor sent to a handheld mobile device can be referred to as a mobile widget precursor.

A user preference and/or a capability indicator is received from the destination content aggregation point in response to the first widget precursor at 950. The capability indicator can be an indicator of a capability associated with the destination content aggregation point and/or the destination network entity. In some embodiments, the capability indicator can be an indicator of the platform of and/or resources available at the destination network entity. In some embodiments, the capability indicator can be, for example, an indicator of a capability of an application configured to process a widget and/or a widget-container associated with the widget. The application can be, for example, a web browser or a mobile content processing application (e.g., WAP browser). In some embodiments, a user preference can be received from the source network entity, in, for example, a sharing signal.

A second widget precursor that is associated with a widget reference is determined and sent based on the capability indicator, the user preference, and/or the widget identifier at 960. For example, a widget reference to a widget that is compatible with a particular destination content aggregation point and/or destination network entity can be determined based on the capability indicator, user preference, and/or the widget identifier. In some embodiments, a link associated with the second widget precursor can be aliased at, for example, a domain name service (DNS) server. In some embodiments, a service module associated with the widget can be selected based on the capability indicator, user preference, and/or the widget identifier.

In some embodiments, the second widget precursor can be, for example, a widget container, a webpage, and/or a WAP page that includes the widget reference. In some embodiments, the second widget precursor can be a reference to a different widget precursor (e.g., a reference to a widget container that includes a link to the widget).

If the second widget precursor is, for example, a WAP page or a webpage, the widget reference can be included in the WAP page or the webpage as a link. In some embodiments, the widget reference can be configured such that the widget reference (e.g., link) can be accessed in response to a user-triggered interaction with the widget reference at the destination network entity.

If the second widget precursor is a widget container (or a reference to a widget container), the widget reference can be contained (e.g., integrated into) in the widget container or included in the widget container as a link that can be accessed in response to a use-triggered interaction at the destination network entity. In some embodiments, the link can be dynamically included in the widget container when the widget container is generated in response to a reference to the widget being accessed from a content aggregation point. In some embodiments, the widget-sharing host can trigger a determination of and/or sending of the second widget precursor.

The widget reference associated with the second widget precursor is accessed at the destination content aggregation point at 970. When the widget reference is accessed, a request for an instance of the widget can be sent to a widget server. In some embodiments, the widget reference can be configured so that the widget reference is automatically accessed at the destination content aggregation point. For example, the widget reference can be included within a portion of software associated with the second widget precursor. When the software of the second widget precursor is executed, the widget reference can be accessed. In some embodiments, if the second widget precursor is a reference to, for example, a widget container that includes the widget reference, the widget container can be requested/received first and the widget reference can subsequently be accessed from the widget container.

An instance of the widget is received at the destination network entity at 980 in response to the widget reference being accessed at 970. The instance of the widget can be sent from a widget server in response to a request received from the destination network entity. The instance of the widget can be receive at the destination content aggregation point.

At least a portion of the widget is executed at the destination content aggregation point of the destination network entity at 990. For example, in some embodiments, the widget can be displayed at the destination content aggregation point. The portion of the widget can be executed in response to a user-triggered interaction.

In some embodiments, an instance of the widget can be shared with a different content aggregation point. For example, as shown in FIG. 9, the destination content aggregation point can function as a source content aggregation point at 995 and can share the widget with another content aggregation point.

In some embodiments, only one widget precursor can be sent rather than two widget precursors. For example, if it is determined based on a sharing signal that the destination network entity is a particular type of device (e.g., determine that destination network entity is a mobile phone because sharing signal indicates destination based on a phone number). In this scenario, a single widget precursor that is a mobile content vehicle that includes a reference to a widget can be sent to the destination network entity. In some embodiments, if the widget precursor is a widget (e.g., WAP page), the widget precursor can be sent without additional linking to a second widget precursor or an additional widget.

In some embodiments, the steps described in FIG. 9 can be performed in a different order and/or at different locations than specified in the figure. For example, the user preference can be received before a placement identifier is defined. For example, the widget-sharing host can trigger a separate entity to perform functions associated with the widget-sharing host.

CONCLUSION

While various embodiments have been described above, it should be understood that they have been presented by way of example only, and not limitation. For example, the module for handling tracking information from multiple instances of widgets described herein can include various combinations and/or sub-combinations of the components and/or features of the different embodiments described. Although described with reference to use with multiple physical or virtual servers, it should be understood that the method for handling tracking information associated with instances of widgets can be used with other computing devices or computing entities. Embodiments of the module for handling tracking information can also include processes different from those described herein. For example, the module for handling tracking information can be configured to collect, process, analyze, modify, and/or organize third-party data before use.

Some embodiments include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language.

A processor according to some embodiments includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as optical disks, and read-only memory ("ROM") and random-access memory ("RAM") devices. Examples of computer code include, but are not limited to, micro-code or micro-instructions, machine instructions, such as produced by a compiler, and files containing higher-level instructions that are executed by a computer using an interpreter. For example, an embodiment may be implemented using Java, C++, or other object-oriented programming language and development tools. Additional examples of computer code include, but are not limited to, control signals, encrypted code, and compressed code.

What is claimed is:

1. A method, comprising:
    receiving tracked information from a plurality of instances of a widget distributed to a plurality of content aggregation points, the widget being at least one of a static object, a media object, or a software object, the tracked information being associated with a plurality of identifiers, the plurality of identifiers including at least a widget identifier and a session identifier;
    analyzing the tracked information based at least in part on the plurality of identifiers; and
    modifying a behavior associated with a first instance of the widget from the plurality of instances of the widget based on the analyzing, the first instance of the widget being placed at a first content aggregation point from the plurality of content aggregation points in response to a sharing request associated with a second instance of the widget at a second content aggregation point from the plurality of content aggregation points, the second instance of the widget being from the plurality of instances of the widget.

2. The method of claim 1, wherein the plurality of identifiers further includes at least one of a user identifier, a placement identifier, a content identifier, a content aggregation point identifier, or a processor identifier.

3. The method of claim 1, wherein the tracked information associated with the plurality of the instances of the widget includes at least one of widget information, user information, placement information, content information, content aggregation point information, or processor information.

4. The method of claim 1, wherein the analyzing includes at least one of a sorting process, a filtering process, an authenticating process, a combining process, a storing process, an analysis process, or a queuing process, the analyzing is performed at one or more stages.

5. The method of claim 1, wherein the analyzing includes filtering the tracked information based on at least one of:
    a validation of a source of at least a portion of the tracked information,
    a validation of at least a portion of the tracked information, or
    a validation of a session associated with at least a portion of the tracked information.

6. The method of claim 1, wherein the tracked information is a first information,
    the method further comprising:
    receiving a second information including at least one of demographic information, behavioral information, optimization information, or validation information, the analyzing including collectively analyzing the first information and the second information based on the plurality of identifiers.

7. The method of claim 1, wherein the modifying includes modifying a behavior associated with a widget container based on the analyzing, the widget container being associated with the first instance of the widget from the plurality of instances of the widget, the widget container being a procedural software framework including a widget reference and a service module.

8. An apparatus, comprising:
a first data handling stage to receive tracked information from a plurality of instances of a widget distributed to a plurality of content aggregation points, the widget being at least one of a static object, a media object, or a software object, the tracked information being associated with a plurality of identifiers;
a second data handling stage to receive the tracked information from the first data handling stage and to analyze the tracked information based on the plurality of identifiers; and
a third data handling stage to modify a behavior associated with a first instance of the widget from the plurality of instances of the widget based on the analysis performed at the second data handling stage, the first instance of the widget being placed at a first content aggregation point from the plurality of content aggregation points in response to a sharing request associated with a second instance of the widget at a second content aggregation point from the plurality of content aggregation points, the second instance of the widget being from the plurality of instances of the widget.

9. The apparatus of claim 8, wherein the plurality of identifiers includes at least one of a widget identifier, a session identifier, a user identifier, a placement identifier, a content identifier, a content aggregation point identifier, or a processor identifier.

10. The apparatus of claim 8, wherein at least one of the first data handling stage, the second data handling stage, or the third data handling stage includes at least one of a sorting process, a filtering process, an authenticating process, a combining process, a storing process, or a queuing process.

11. The apparatus of claim 8, wherein one or more of the first data handling stage, the second data handling stage, and the third data handling stage is performed in a single computing entity.

12. The apparatus of claim 8, wherein a function associated with the first data handling stage is performed at a first portion of a plurality of computing entities and a function associated with the second data handling stage is performed at a second portion of a plurality of computing entities, the first data handling stage and the second data handling stage are pipelined stages.

13. The apparatus of claim 8, wherein a function associated with the first data handling stage is performed at a plurality of computing entities, the first instance of the widget is to exclusively send information associated with the first instance of the widget to a specified portion of the plurality of computing entities.

14. The apparatus of claim 8, wherein at least one of the first data handling stage, the second data handling stage, or the third data handling stage is a pipelined stage.

15. A method, comprising:
receiving tracked information from a first instance of a widget, the widget being at least one of a static object, a media object, or a software object, the tracked information including session information associated with a session corresponding to the first instance of the widget, the session information having information associated with a plurality of identifiers;
analyzing the session information based at least in part on the plurality of identifiers to produce processed information, the processed information being stored in one or more data structures; and
determining a modification to a behavior associated with the first instance of the widget based on the processed information, the first instance of the widget being placed at a first content aggregation point in response to a sharing request associated with a second instance of the widget at a second content aggregation point.

16. The method of claim 15, further comprising modifying the behavior associated with the first instance of the widget based on the modification.

17. The method of claim 15, wherein the analyzing includes analyzing the session information for the first instance of the widget when one of the following occurs:
a predetermined time is reached after a last occurrence of an activity associated with the first instance of the widget,
the first content aggregation point is closed,
a predetermined time is reached after the first instance of the widget is placed at the first content aggregation point, or
a signal indicative of a session termination is received from the first instance of the widget.

18. The method of claim 15, wherein the plurality of identifiers includes at least one of a widget identifier, a session identifier, a user identifier, a placement identifier, a content identifier, a content aggregation point identifier, or a processor identifier.

19. The method of claim 15, wherein the analyzing includes at least one of a sorting process, a filtering process, an authenticating process, a combining process, a storing process, an analysis process, or a queuing process.

20. The method of claim 15, wherein the one or more data structures include at least one of:
a hierarchical time-based data structure,
a hierarchical user-based data structure,
a hierarchical widget-based data structure,
a hierarchical content-based data structure,
a hierarchical session-based data structure,
a hierarchical placement-based data structure, or
a hierarchical content-aggregation-point-based data structure.

21. The method of claim 15, further comprising modifying the behavior associated with the first instance of the widget based on the determined modification, the modifying occurs during at least one of:
a load time of the first instance of the widget,
a rendering time of the first instance of the widget, or
a lifetime of the first instance of the widget.

22. The method of claim 15, wherein the receiving is performed by a plurality of computing entities, the method further comprising:
sending information associated with the first instance of the widget to a specified portion of the plurality of computing entities.

23. A system, comprising:
one or more servers configured to receive tracked information from a first instance of a widget, the widget being at least one of a static object, a media object, or a software object, the tracked information being associated with a plurality of identifiers, the plurality of identifiers including at least a widget identifier and a session identifier,
the one or more servers are configured to analyze the tracked information based on the plurality of identifiers to produce processed information, and the one or more servers are configured to modify a behavior associated with the first instance of the widget based on the processed information, the first instance of the widget being placed at a first content aggregation point in response to a sharing request associated with a second instance of the widget at a second content aggregation point.

24. The system of claim 23, wherein at least one of the one or more servers is a virtual server.

25. The system of claim 23, wherein the one or more servers are configured to modify a behavior associated with a widget container based on the processed information, the widget container being associated with the first instance of the widget, the widget container being a procedural software framework including a widget reference and a service module.

26. The method of claim 1, wherein the analyzing the tracked information includes analyzing the tracked information to determine at least one of a historical trend, a projection, a correlation or a statistical calculation associated with the plurality of instances of the widget.

27. The method of claim 1, wherein the widget is a first widget, the method further comprising:
modifying a behavior associated with an instance of a widget from a plurality of instances of a second widget distinct from the first widget based on the analyzing.

* * * * *